(12) United States Patent
Smekalov et al.

(10) Patent No.: US 12,061,546 B2
(45) Date of Patent: Aug. 13, 2024

(54) TECHNIQUE FOR PROCESSING LOOKUP REQUESTS, IN A CACHE STORAGE ABLE TO STORE DATA ITEMS OF MULTIPLE SUPPORTED TYPES, IN THE PRESENCE OF A PENDING INVALIDATION REQUEST

(71) Applicant: Arm Limited, Cambridge (GB)

(72) Inventors: Anton Smekalov, Manchester (GB); Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 25 days.

(21) Appl. No.: 17/973,433

(22) Filed: Oct. 25, 2022

(65) Prior Publication Data
US 2024/0134794 A1   Apr. 25, 2024
US 2024/0232081 A9   Jul. 11, 2024

(51) Int. Cl.
*G06F 12/0808* (2016.01)
*G06F 12/02* (2006.01)

(52) U.S. Cl.
CPC ...... *G06F 12/0808* (2013.01); *G06F 12/0238* (2013.01); *G06F 2212/1021* (2013.01)

(58) Field of Classification Search
CPC ............. G06F 12/0238; G06F 12/0808; G06F 2212/1021
See application file for complete search history.

(56) References Cited

U.S. PATENT DOCUMENTS

2021/0182216 A1* 6/2021 Yin ................... G06F 12/126

* cited by examiner

*Primary Examiner* — Larry T MacKall
(74) *Attorney, Agent, or Firm* — NIXON & VANDERHYE P.C.

(57) ABSTRACT

Each entry in a cache has type information associated therewith to indicate a type associated with the data item stored in that entry. Lookup circuitry responds to a given lookup request by performing a lookup procedure to determine whether a hit is detected, by default performing the lookup procedure for a given subset of multiple supported types. Invalidation circuitry processes an invalidation request specifying invalidation parameters used to determine an invalidation address range and invalidation type information, in order to invalidate any data items held in the cache storage that are both associated with the invalidation address range and have an associated type that is indicated by the invalidation type information. Whilst processing of the invalidation request is yet to be completed, filtering circuitry performs a filtering operation for a received lookup request, in order to determine, in dependence on an address indication provided by the received lookup request and one or more of the invalidation parameters of the invalidation request, intersection indication data identifying, for a given type in the given subset, whether an intersection is considered to exist between any entries that would be accessed during performance of the lookup procedure for the received lookup request for the given type and any entries that will be invalidated during processing of the invalidation request, and operation of the lookup circuitry is controlled in dependence on the intersection indication data.

16 Claims, 15 Drawing Sheets

FIG.8

TECHNIQUE FOR PROCESSING LOOKUP REQUESTS, IN A CACHE STORAGE ABLE TO STORE DATA ITEMS OF MULTIPLE SUPPORTED TYPES, IN THE PRESENCE OF A PENDING INVALIDATION REQUEST

BACKGROUND

The present technique relates to an apparatus and method for operating a cache storage.

A cache storage (also referred to as a cache herein) can be arranged to store data for access by a processing element, enabling access to that data with improved performance, and reduced power consumption, when compared with accessing that data from memory. In some implementations, a cache may be subjected to invalidation requests seeking to invalidate the data held in one or more entries of the cache, and an issue that arises is how to handle lookup requests received by the cache during the period in which an invalidation request is being processed.

In particular, it can take a significant amount of time to process an invalidation request, but it may be important in a variety of implementations to ensure that during the period the invalidation procedure is being performed, a lookup request received by the cache does not result in data being accessed within the cache to service that lookup request, in a situation where that data will be invalidated by the invalidation request.

This issue can become more complex to handle in caches that are arranged to store data of multiple different types. In particular, in such scenarios, it may generally take longer to process an invalidation request, and it may also take longer to process lookup requests, due to the potentially multiple different types of data to be considered. For performance reasons, it is desirable not to unduly impact the handling of lookup requests in situations where there is a pending invalidation request to be processed. However, for power consumption reasons, it would also be desirable not to perform lookup operations whose results may then need to be discarded as a result of the processing of the invalidation request (such unnecessary lookups also have the potential to impact performance by slowing down the invalidation procedure by consuming bandwidth that could instead have been used to process the required invalidations).

SUMMARY

In one example arrangement, there is provided an apparatus comprising: a cache storage having a plurality of entries for storing data items, wherein each entry is arranged to have type information associated therewith to indicate a type associated with the data item stored in that entry, and wherein for each entry the type is one of multiple supported types for which the cache storage is enabled to store data items; lookup circuitry to process lookup requests, wherein the lookup circuitry is responsive to a given lookup request providing an address indication to perform a lookup procedure to determine whether a hit is detected indicating that an entry of the cache storage stores a data item associated with the address indication, by default the lookup circuitry being arranged to perform the lookup procedure for a given subset of the multiple supported types; invalidation circuitry to process an invalidation request specifying invalidation parameters used to determine an invalidation address range and invalidation type information, in order to invalidate any data items held in the cache storage that are both associated with the invalidation address range and have an associated type that is indicated by the invalidation type information; and filtering circuitry arranged, whilst processing of the invalidation request is yet to be completed, to perform a filtering operation for a received lookup request, in order to determine, in dependence on the address indication provided by the received lookup request and one or more of the invalidation parameters of the invalidation request, intersection indication data identifying, for a given type in the given subset, whether an intersection is considered to exist between any entries that would be accessed during performance of the lookup procedure for the received lookup request for the given type and any entries that will be invalidated during processing of the invalidation request, and to control operation of the lookup circuitry in dependence on the intersection indication data.

In another example arrangement, there is provided a method of operating a cache storage, comprising: providing the cache storage with a plurality of entries for storing data items, wherein each entry is arranged to have type information associated therewith to indicate a type associated with the data item stored in that entry, and wherein for each entry the type is one of multiple supported types for which the cache storage is enabled to store data items; performing, in response to a given lookup request providing an address indication, a lookup procedure to determine whether a hit is detected indicating that an entry of the cache storage stores a data item associated with the address indication, by default the lookup procedure being performed for a given subset of the multiple supported types; processing an invalidation request specifying invalidation parameters used to determine an invalidation address range and invalidation type information, in order to invalidate any data items held in the cache storage that are both associated with the invalidation address range and have an associated type that is indicated by the invalidation type information; employing filtering circuitry, whilst processing of the invalidation request is yet to be completed, to perform a filtering operation for a received lookup request, in order to determine, in dependence on the address indication provided by the received lookup request and one or more of the invalidation parameters of the invalidation request, intersection indication data identifying, for a given type in the given subset, whether an intersection is considered to exist between any entries that would be accessed during performance of the lookup procedure for the received lookup request for the given type and any entries that will be invalidated during processing of the invalidation request; and controlling performance of the lookup procedure in dependence on the intersection indication data.

In a still further example arrangement, there is provided a non-transitory computer-readable medium to store computer-readable code for fabrication of an apparatus comprising: a cache storage having a plurality of entries for storing data items, wherein each entry is arranged to have type information associated therewith to indicate a type associated with the data item stored in that entry, and wherein for each entry the type is one of multiple supported types for which the cache storage is enabled to store data items; lookup circuitry to process lookup requests, wherein the lookup circuitry is responsive to a given lookup request providing an address indication to perform a lookup procedure to determine whether a hit is detected indicating that an entry of the cache storage stores a data item associated with the address indication, by default the lookup circuitry being arranged to perform the lookup procedure for a given subset of the multiple supported types; invalidation circuitry to process an invalidation request specifying invalidation parameters used to determine an invalidation address range and invalidation type information, in order to invalidate any data items held in the cache storage that are both associated with the invalidation address range and have an associated type that is indicated by the invalidation type information; and filtering circuitry arranged, whilst processing of the invalidation request is yet to be completed, to perform a filtering operation for a received lookup request, in order to determine, in dependence on the address indication provided by the received lookup request and one or more of the invalidation parameters of the invalidation request, intersection indication data identifying, for a given type in the given subset, whether an intersection is considered to exist between any entries that would be accessed during performance of the lookup procedure for the received lookup request for the given type and any entries that will be invalidated during processing of the invalidation request, and to control operation of the lookup circuitry in dependence on the intersection indication data. Such computer-readable code can be disposed in any known transitory computer-readable medium (such as wired or wireless transmission of code over a network) or non-transitory computer-readable medium such as semiconductor, magnetic disk, or optical disc.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
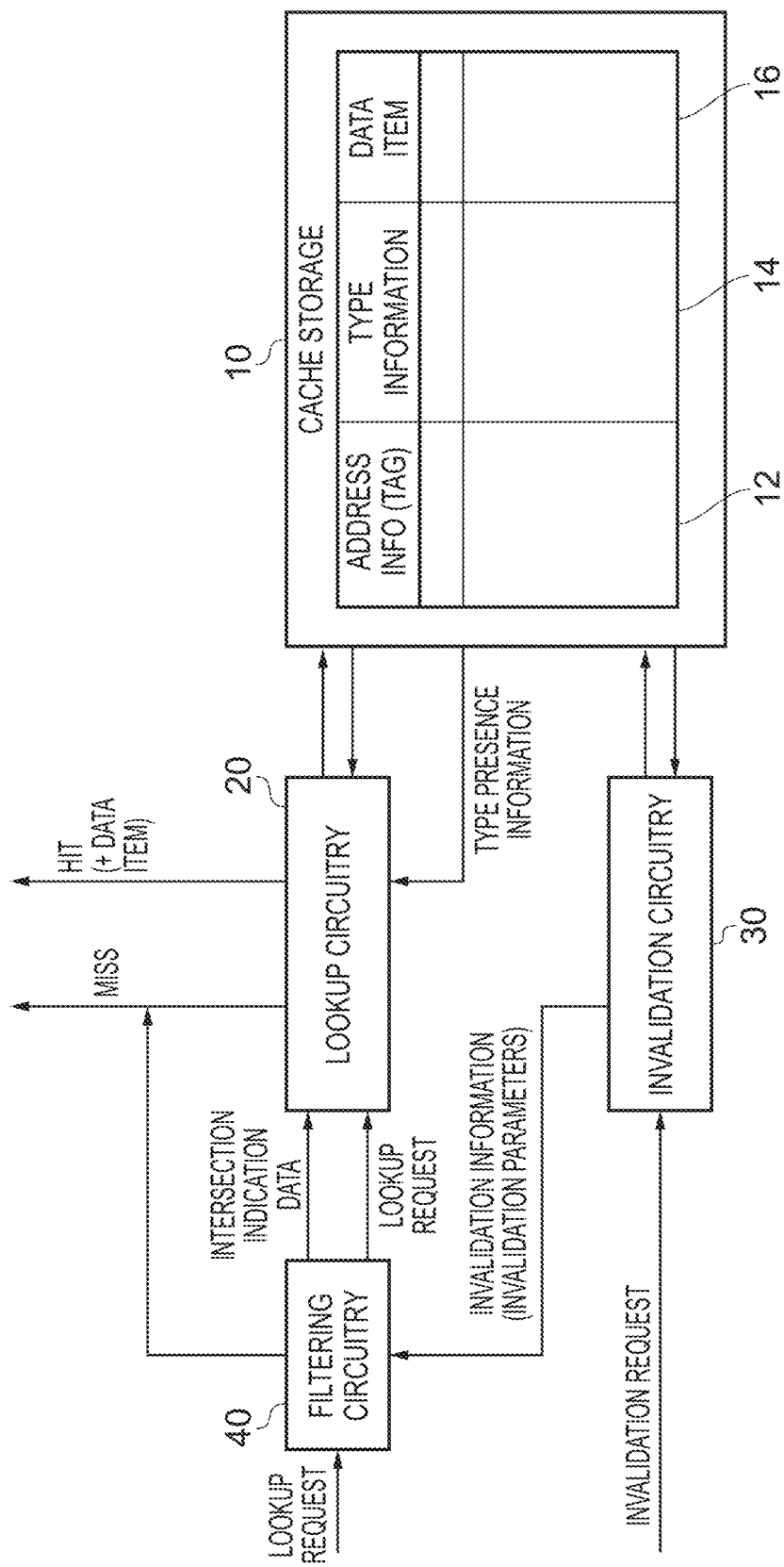
FIG. 1 is a block diagram of an apparatus in accordance with one example implementation.

In accordance with the techniques described herein, an apparatus provides a cache storage having a plurality of entries for storing data items. Each entry is arranged to have type information associated therewith to indicate the type associated with the data item stored in that entry. For each entry the type is one of multiple supported types for which the cache storage is enabled to store data items. The type information may in one example implementation be stored within one or more fields provided within each entry, or alternatively the type information may be stored in a separate storage structure, but associated with each entry in the cache storage.

There are various forms of cache that can be arranged to store data of different types. One example is an address translation cache (which may also be referred to herein as a translation lookaside buffer (TLB)) employed to cache address translation information used when converting a virtual address into a corresponding physical address. Another example is a granule protection information (GPI) cache used to cache granule protection information obtained from a granule protection table (GPT) in memory, such granule protection information indicating, for at least one granule of physical addresses, which of a plurality of physical address spaces is allowed to access that granule of physical addresses. In both of these examples, data of a variety of different types may be stored. For example, each different type may have an associated address range size, such that any pair of entries whose stored data items relate to different address range sizes can be viewed as entries storing data of different types. The type information in this scenario is hence the information that identifies the address range size. In addition, or alternatively, the type information may distinguish between entries storing final data (e.g. virtual to physical address translation information in the example of a TLB, or granule protection information in the example of a GPI cache) and entries storing intermediate data, such as pointers to tables in memory that can be used to determine the final data.

It will be appreciated that the above are just two examples of type information that can be used to indicate the different types of the data items stored within the cache storage, and in other implementations other items of information, or combinations of items of information, stored in association with each of the entries can be used to distinguish between different types of data stored within the cache.

The apparatus described herein also has lookup circuitry that is used to process lookup requests. In particular, the lookup circuitry is responsive to a given lookup request, such a lookup request providing an address indication, to perform a lookup procedure to determine whether a hit is detected indicating that an entry of the cache storage stores a data item associated with that address indication. By default, the lookup circuitry is arranged to perform the lookup procedure for a given subset of the multiple supported types. The given subset may be one or more of the multiple supported types, and indeed in some instances the given subset may comprise all of the multiple supported types. Exactly which types are included within the given subset for any given lookup request may be dependent on the form of that lookup request, and the type of cache storage under consideration.

There are a number of ways in which the lookup procedure may be performed in response to the lookup request. In one example implementation, a separate lookup within the cache may be necessary for each of the types identified within the given subset when employing the above default processing, and hence the performance of the lookup procedure may take multiple cycles to perform, and may involve significant power consumption. By way of specific example, when the type information includes at least size information, and where the cache is a set associative cache, the index used to identify the set within the cache that should be subjected to the lookup will be generated in dependence on the size information, and hence a separate index will be generated for each type in the given subset.

The apparatus described herein also provides invalidation circuitry that is used to process an invalidation request that specifies invalidation parameters used to determine an invalidation address range and invalidation type information. In particular, the processing of the invalidation request will cause invalidation of any data items held in the cache storage that are both associated with the invalidation address range and have an associated type that is indicated by the invalidation type information. The invalidation type information may limit the invalidation procedure only to entries whose stored data items are of one or more specific types, or in some instances may identify that all of the different types of data within the cache should be considered when processing the invalidation request.

As discussed earlier, one issue that arises is how to handle lookup requests whilst there is a pending invalidation request to be processed. One approach could be to treat all such lookup requests as resulting in a miss, so as to avoid the possibility of hitting on an entry whose contents will be invalidated once the invalidation request has been processed. However, this has performance and power consumption implications due to the need to then access lower levels of cache and/or main memory. Alternatively, it could be decided to stall the handling of all such lookup requests until the invalidation request has been processed, but this will impact performance.

In accordance with the techniques described herein an alternative approach is taken. In particular, filtering circuitry is provided that is arranged, whilst processing of the invalidation request is yet to be completed, to perform a filtering operation for a received lookup request. In particular, the filtering operation is used to determine, in dependence on the address indication provided by the received lookup request, and one or more of the invalidation parameters of the invalidation request, intersection indication data. Such intersection indication data identifies, for a given type in the given subset, whether an intersection is considered to exist between any entries that would be accessed during performance of the lookup procedure for the received lookup request for the given type and any entries that will be invalidated during processing of the invalidation request. The filtering circuitry can then be arranged to control operation of the lookup circuitry in dependence on the intersection indication data.

Hence, such an approach enables some processing of lookup requests to take place whilst an invalidation request is in the process of being handled, and in particular by virtue of the intersection indication data it can be determined whether performance of the lookup request for one or more types should definitely be treated as a miss (due to the fact that the data in question, if in the cache, will be invalidated in the cache by the performance of the invalidation request) or whether the performance of the lookup request for one or more types may potentially yield valid hit data (and hence should not merely be treated as a miss).

The one or more invalidation parameters considered by the filtering circuitry may vary dependent on implementation. By way of specific example, considering an implementation where the cache storage takes the form of the earlier described GPI cache providing granule protection information for different blocks of physical addresses, the invalidation parameters referred to may take the form of an invalidation physical address, an invalidation size (i.e. defining a range of physical addresses based on the specified invalidation physical address, whose associated granule protection information should be invalidated within the cache), and a form of invalidation operation to be performed (which can for example be used to identify which types of data items should be subjected to the invalidation procedure).

However, in other instances the invalidation parameters referred to can take other forms. For example, considering a TLB implementation, one or more of a virtual address, a virtual address range, context information defining the scope of entries to be invalidated, translation granule size information identifying the translation granule size for the address translations that are to be invalidated (with the translation granule size in bytes being used in determining the address range), and translation table level hint information (which can be used to indicate the lookup level of the translation table walk process that holds the final level descriptor used to determine a physical address from a corresponding virtual address) may be specified as invalidation parameters of an invalidation request, and one or more of those invalidation parameters may be referred to by the filtering circuitry.

The intersection indication data may be produced for a number of different types that may be associated with the data items stored within the cache storage. For example, such intersection indication data may be produced for each type within the given subset (i.e. for those types that by default would be subjected to the lookup procedure in response to the given lookup request), or indeed in some instances may be produced for all of the multiple supported types, irrespective of whether the given subset identifies all supported types or only some of those supported types.

It should also be noted that whilst the intersection indication data identifies whether an intersection is considered to exist, whether a precise indication of the presence or absence of an intersection can be determined may vary dependent on the invalidation parameters used. For instance, in some example implementations, and for at least one of the types considered, the filtering circuitry may only be able to determine a potential presence of an intersection rather than an actual presence of an intersection. Nevertheless, this information is still useful when deciding how to process the given lookup request, as will be apparent from the later discussions herein.

The intersection indication data can take a variety of forms. In one example implementation, when, for the given type, the intersection indication data indicates absence of an intersection, the lookup circuitry is enabled to perform the lookup procedure for the received lookup request for the given type, and to generate a hit indication in response to the hit being detected, without waiting for the processing of the invalidation request to be completed. Hence, in such a scenario, it is known that the outcome of performing the lookup procedure for the received lookup request for the given type can be relied upon, since in the event that there is a hit detected, the data item in the hit entry can be used since it will not be invalidated by the pending invalidation request. Hence, there is no need to stall performance of the lookup request for that given type to await the outcome of processing of the invalidation request, and in the event of a hit being detected the data item in the hit entry can be used without needing to await the outcome of the performance of the invalidation request.

In one example implementation, when, for the given type, the intersection indication data indicates presence of an intersection, the lookup circuitry is inhibited from performing the lookup procedure for the received lookup request for the given type. Depending on implementation, it may be the case that the lookup circuitry still receives the lookup request, along with the associated intersection indication data produced by the filtering circuitry, and then decides how to process that lookup request for each relevant type dependent on the intersection indication data for that type. Hence, in the above scenario, where for any given type the intersection indication data indicates presence of an intersection, the lookup circuitry can omit performance of the lookup for that given type, hence reducing the processing required in order to implement the lookup procedure (by effectively reducing the number of different types that need to be considered when performing the lookup procedure).

In one particular example implementation, when the intersection indication data identifies presence of an intersection for every type in the given subset, the filtering circuitry may be arranged to cause a miss indication to be generated for the received lookup request. Hence, in such a scenario, the filtering circuitry may itself generate the miss indication without needing to forward the lookup request on to the lookup circuitry along with the associated intersection indication data. This can improve performance by enabling an early indication of the miss, and reduce power consumption by avoiding the lookup circuitry from needing to process the lookup request.

As mentioned earlier, in some implementations there may be scenarios where a precise indication of the presence or absence of an intersection cannot be given, at least for one or more types in the given subset. Hence, in one example implementation the filtering circuitry may be able to indicate a potential presence of an intersection rather than an actual presence of an intersection. In one particular example implementation, when, for the given type, the intersection indication data indicates potential presence of an intersection, the lookup circuitry may be arranged to defer performing the lookup procedure for the received lookup request for the given type until processing of the invalidation request has been completed.

Such deferral may apply only to one or more particular given types for which the potential presence of an intersection has been detected, or alternatively the potential presence of an intersection information may be used to defer performance of the entire lookup procedure for all types in the given subset, until the invalidation request has been processed.

The intersection indication data can take a variety of forms. However, in one example implementation the intersection indication data takes the form of a vector providing an intersection indication value for at least each type in the given subset of the multiple supported types (i.e. for at least each type that will, by default, be subjected to the lookup procedure for the given lookup request). Each intersection indication value provided within the vector can take a variety of forms. For example, in implementations where the intersection indication value may indicate either absence or presence of an intersection, a single bit value may be used. However, in other implementations more bits may be used to form the intersection indication value, for example where there are more than two possible indications that may be made about an intersection (for example including the possibility of a potential presence of an intersection).

In one example implementation, the cache storage may be arranged to generate type presence information identifying each type in at least the given subset for which the cache storage currently has one or more entries storing associated data items, and the lookup circuitry is arranged to control performance of the lookup procedure in dependence on both the type presence information and the intersection indication data. Hence, not only may the intersection indication data potentially reduce the number of types for which the lookup procedure needs to be performed, but also the type presence information may enable a reduction in the number of types for which the lookup procedure needs to be performed.

The type presence information may take a variety of forms, but in one example implementation takes the form of a vector providing a presence indication value for at least each type in the given subset, each presence indication value identifying whether the cache storage has at least one entry storing data items of the associated type. In one particular example implementation each presence indication value takes the form of a single bit value.

Hence, the type presence information and the intersection indication data may in one example implementation be provided in the same vector form, enabling the information in both of those vectors to be readily combined in order to influence the lookup procedure performed by the lookup circuitry for the given lookup request.

The type information stored in association with each entry within the cache storage can take a variety of forms. However, in one example implementation, for a given entry the type information indicates a size of a match address range for the associated data stored in that given entry, and for the hit to be detected for the given entry the address indication provided by the received lookup request is required to identify an address falling within the match address range. Hence, in such implementations, at least some of the different types associated with data items may identify different sizes of the match address range, with that size information being used when determining whether a hit has been detected based on the address indication provided by the received lookup request.

In such implementations, the invalidation circuitry may be arranged, when processing the invalidation request, to invalidate the data item held in a given entry of the cache storage when the given entry stores a data item having an associated type identified by the invalidation type information and the invalidation address range at least partly overlaps the match address range.

The data items stored within the cache can take a variety of forms. In one example implementation, one or more of the data items stored within the cache may provide access control information used to constrain access to addresses associated with those data items.

By way of specific example, the apparatus may further comprise address translation circuitry used to translate a target virtual address specified by a memory access request into a target physical address associated with a selected physical address space selected from among a plurality of physical address spaces. In such an implementation, a given data item stored in the cache storage may comprise granule protection information indicating, for at least one granule of physical addresses, which of the plurality of physical address spaces is allowed access to the at least one granule of physical addresses.

In such an implementation, the different types of data items stored within the cache may take a variety of forms. However, by way of example, the number of granules of physical addresses associated with a given data item may be dependent on the type associated with the given data item.

In one example implementation, each data item stored in the cache may provide such granule protection information, but in another example implementation the cache may additionally be able to store other information as data items. For instance, the granule protection information may be obtained by performing a multi-level table walk in memory, with the final level table providing the granule protection information, but with a non-final level table providing a pointer to a next level table. In such cases, it is possible that one or more of the entries may store a pointer to a next level table in memory. Such cached information may improve the speed with which the above multi-level table walk can be performed, by using the cached information to avoid one or more levels of the table walk.

Whilst in the above example the cache is used to store granule protection information, the techniques described herein may also be used in association with other cache structures. For example, the cache storage may comprise an address translation cache, and a given data item within that cache may comprise address translation data for use when converting a virtual address into a corresponding physical address of a memory system. Whilst it may be the case that all of the data items within the cache comprise such address translation information, in other implementations one or more of the entries may store partial address translation information, which may for example include pointers to intermediate tables accessed when performing a page table walk to determine how to translate a virtual address into a corresponding physical address.

Whilst the techniques described herein may directly be incorporated in an apparatus, and/or be used to control one or more processes performed by such an apparatus, the concepts described herein may additionally, or alternatively, be embodied in computer-readable code for fabrication of an apparatus that embodies the described concepts. For example, the computer-readable code can be used at one or more stages of a design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL.

Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular example configurations will now be described with reference to the figures.

FIG. 1 is a block diagram of an apparatus in accordance with one example implementation. Cache storage 10 (also referred to herein simply as a cache) has a plurality of entries for storing data items. Each entry comprises a number of fields, and in the example shown in FIG. 1 includes the fields 12, 14 and 16. In particular, the field 12 is an address field that provides address information associated with the data item stored in that entry. The address information will typically specify a portion of the memory address (which may be referred to as a tag portion), and will be compared with the corresponding portion of the memory address specified in a lookup request in order to determine whether there is a match, such a match indicating that the data item stored in that entry is the data item that the lookup request is seeking to access, this being referred to as a hit within the cache. Conversely, in the event of there not being a match between the compared memory address portions, this is referred to as a miss within the cache.

The actual entries considered when processing a lookup request may vary dependent on the manner in which the cache is organised. For example, considering a set associative cache, an index portion of the address indication specified by the lookup request is used to identify a set within the cache, such a set typically comprising one entry in each of a plurality of ways within the cache. Then a tag portion of the address indication specified by the lookup request is compared with the corresponding tag portion in each of the entries of the set to determine whether there is a hit or a miss. As also shown in FIG. 1, a field 14 is used to specify type information. In particular, in accordance with the techniques described herein, the cache is able to store data items of different types, and the type information field 14 is used to identify, for any given entry, the type associated with the data item stored in that entry. The data item is then stored within the data field 16 of the entry.

There are various forms of cache that can be arranged to store data of different types, for example the earlier-mentioned address translation cache (translation lookaside buffer (TLB)) or granule protection information (GPI) cache. In both of these examples, data of a variety of different types may be stored. For example, each different type may have an associated address range size, such that any pair of entries whose stored data items relate to different address range sizes can be viewed as entries storing data of different types. The type information in this scenario is hence the information that identifies the address range size. In addition, or alternatively, the type information may distinguish between entries storing final data (e.g. virtual to physical address translation information in the event of a TLB, or granule protection information in the event of a GPI cache) and entries storing intermediate data, such as pointers to tables in memory that can be used to determine the final data. In addition, or alternatively, other items of information, or combinations of items of information, stored in association with each of the entries can be used to distinguish between different types of data stored within the cache.

At least in situations where the different types include different address range sizes, then in the above example of a set associative cache the number of bits of a memory address used to form the index portion used to identify a cache set may vary dependent on the address range size being assumed when performing the corresponding lookup, and accordingly a lookup procedure may involve performing iterative lookups for the various different types of data items that may be stored within the cache, to see whether a hit is detected for any of the different types.

Such lookup operations may be performed by the lookup circuitry 20, which in response to a received lookup request, may perform a lookup procedure that involves a series of lookups within the cache 10 for each of a number of different assumed types of data that may be stored therein, with the lookup circuitry then producing a miss or hit signal to return to the processing element that issued the lookup request, dependent on the outcome of the lookup procedure. As shown in FIG. 1, the cache may be arranged to issue type presence information identifying each type for which the cache storage currently has one or more entries storing associated data items. This can be used to reduce the number of iterative lookups that may be required when processing the lookup request. Merely by way of example, if there are six different types of data item that may be stored within the cache storage, but the type presence information indicates that no entries are currently storing data items of two of those types, then the lookup circuitry can exclude those two types from the lookup procedure, hence reducing the number of iterative lookups that may be required.

As also shown in FIG. 1, the apparatus has invalidation circuitry 30 that is responsive to an invalidation request to perform an invalidation procedure to seek to invalidate the contents of one or more entries within the cache. In particular, the invalidation request can be arranged to specify invalidation parameters that are used to determine an invalidation address range and invalidation type information, and the invalidation circuitry 30 will be arranged to invalidate any data items held in the cache that are both associated with the invalidation address range and have an associated type that is indicated by the invalidation type information. The invalidation request may take a variety of forms, and the number of different types associated with any given invalidation request may hence vary. For example, one form of invalidation request may seek to invalidate any data items held in the cache that are associated with the invalidation address range irrespective of the associated type of the data item, whilst another form of invalidation request may be targeted at data items of one or more particular types.

In accordance with the techniques described herein, filtering circuitry 40 is provided that can be used to perform a filtering operation on lookup requests that are received whilst there is a pending invalidation request in the process of being actioned by the invalidation circuitry 30. Hence, whilst there is a pending invalidation request being processed by the invalidation circuitry, the apparatus can be viewed as entering a filtering mode of operation, where received lookup requests are subjected to a filtering operation by the filtering circuitry 40.

As shown in FIG. 1, the filtering circuitry 40 receives the lookup requests, but also receives invalidation information from the invalidation circuitry 30, this invalidation information typically taking the form of one or more of the invalidation parameters specified by the invalidation request. Based on the address indication provided by a received lookup request, and the invalidation information received from the invalidation circuitry, the filtering circuitry performs a filtering operation in order to determine intersection indication data identifying, for one or more types of data item that may be stored within the cache, whether an intersection is considered to exist between any entries that would be accessed during performance of the lookup procedure for the received lookup request for those one or more types, and any entries that will be invalidated during processing of the invalidation request. The operation of the lookup circuitry can then be controlled in dependence on the intersection indication data. In one example implementation, the intersection indication data is arranged to identify, for at least each type of data item that will be considered during processing of the lookup request, whether such an intersection is considered to exist. It may be the case that certain lookup requests only require a lookup to be performed for some, but not all, of the types of data item that may potentially be stored within the cache (herein all of the types that may potentially be stored within the cache also being referred to as the "supported types" of the cache). However, other lookup requests may require a lookup to be performed for all of the supported types.

Once the intersection indication data has been generated for the relevant types of data item, then that information can be passed on to the lookup circuitry 20 along with the lookup request, with the lookup circuitry then using the intersection indication data to control performance of the lookup procedure. In particular, in much the same way as the earlier discussed type presence information, the intersection indication data may indicate to the lookup circuitry that certain lookups can be omitted. For instance, if it is known that there is an intersection for a given type, then the associated lookup for that given type can be omitted since it is known that even if a hit were detected, that data item could not be used as it will be invalidated by the invalidation request. Conversely, if it is known that there is not an intersection for a given type, then the associated lookup for that given type can be performed without needing to wait for the outcome of the invalidation procedure, and if a hit is detected that data item can be used as a response to the lookup request.

In one particular example implementation, the intersection indication data is combined with the type presence information by the lookup circuitry when deciding which lookups to perform for any given lookup request.

In one particular example embodiment, if the filtering circuitry decides that there is a presence of an intersection for every type for which a lookup would need to be performed in order to process the lookup request, then the filtering circuitry 40 may directly assert the miss signal for return to the processing element that issued the lookup request, and in that case may not forward the lookup request or the intersection indication data to the lookup circuitry. In particular, in that scenario it has been determined that no lookups are required since none of the results of such lookups would be valid given the entries that will be invalidated by the invalidation request.

Figure 2:
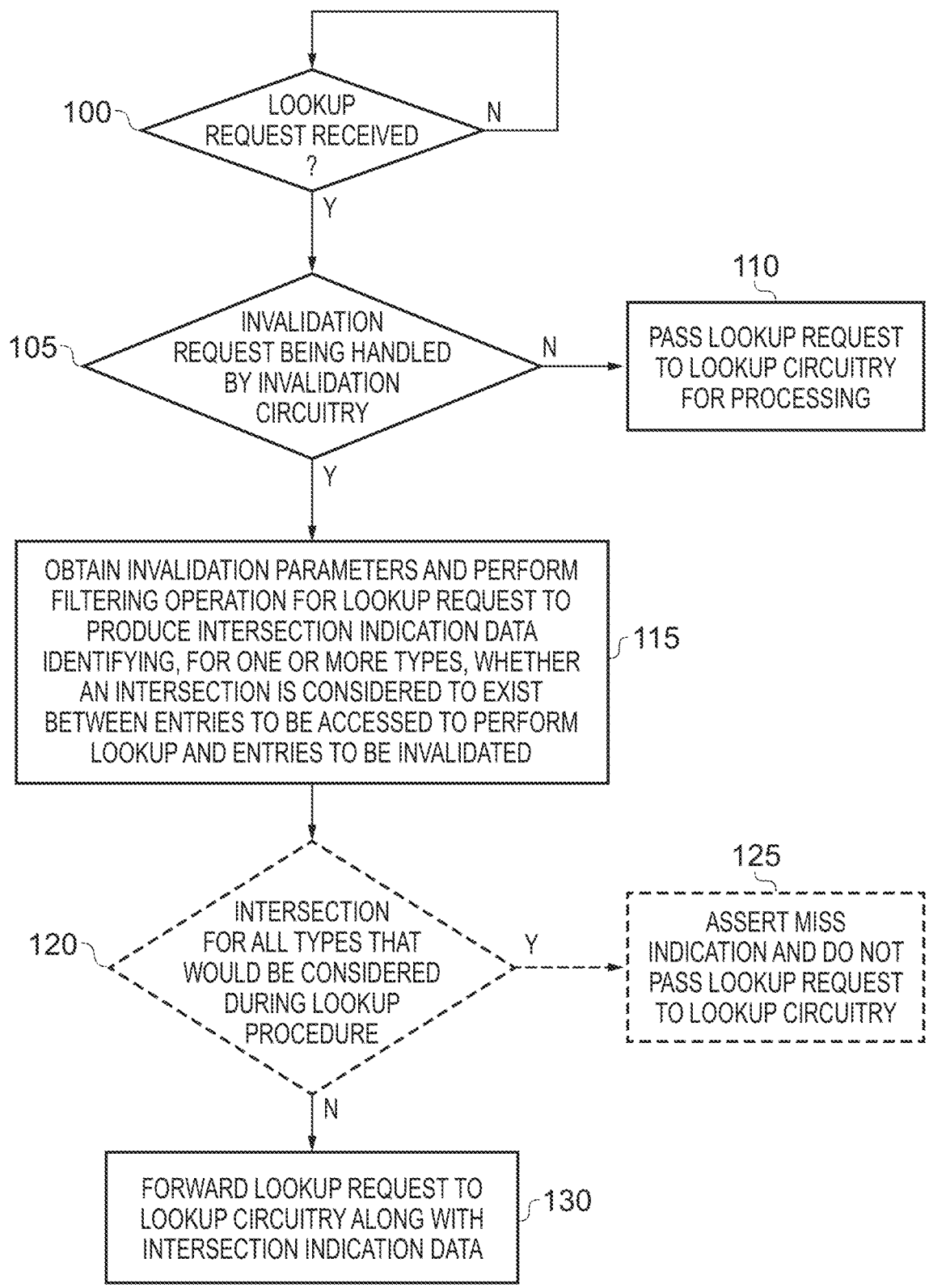
FIG. 2 is a flow diagram illustrating the operation of the filtering circuitry of FIG. 1 in accordance with one example implementation.

FIG. 2 is a flow diagram illustrating the operation of the filtering circuitry 40 of FIG. 1 in accordance with one example implementation. At step 100, it is determined whether a lookup request has been received, and on receipt of such a lookup request it is then determined at step 105 whether an invalidation request is currently being handled by the invalidation circuitry 30. If not, then the process proceeds to step 110, where the filtering circuitry 40 merely passes the lookup request on to the lookup circuitry 20 for handling in the normal manner.

However, if at step 105 it is determined that there is an invalidation request currently being handled, then as discussed earlier the apparatus enters a filtering mode of operation in which the filtering circuitry 40 performs a filtering operation on the lookup request. Accordingly, the process proceeds to step 115, where one or more invalidation parameters are obtained from the invalidation circuitry 30, and a filtering operation is performed for the lookup request in order to produce intersection indication data identifying, for one or more types, whether an intersection is considered to exist between the entries to be accessed to perform the lookup for those one or more types, and the entries that are to be invalidated by performance of the invalidation request. As mentioned earlier, the filtering circuitry 40 will in one example implementation produce intersection indication data for each of the types for which a lookup would by default be performed in order to process the lookup request.

At step 120, the filtering circuitry may perform an optional additional check of determining whether an intersection has been detected for all of the types that would be considered during the lookup procedure, and if so, then at step 125 the filtering circuitry may then directly be arranged to assert a miss indication. In that event, the lookup request will not be passed on to the lookup circuitry 20.

However, if an intersection has not been detected for all of the types that would be considered during the lookup procedure, or if the optional check of step 120 is not performed by the filtering circuitry 40, then at step 130 the lookup request is forwarded from the filtering circuitry to the lookup circuitry 20 along with the intersection indication data generated by the filtering circuitry, with that intersection indication data then being used by the lookup circuitry when determining which lookups to perform in order to process the lookup request. As discussed earlier, the lookup circuitry may combine the intersection indication data with the type presence information when making such a determination.

Figure 3A:
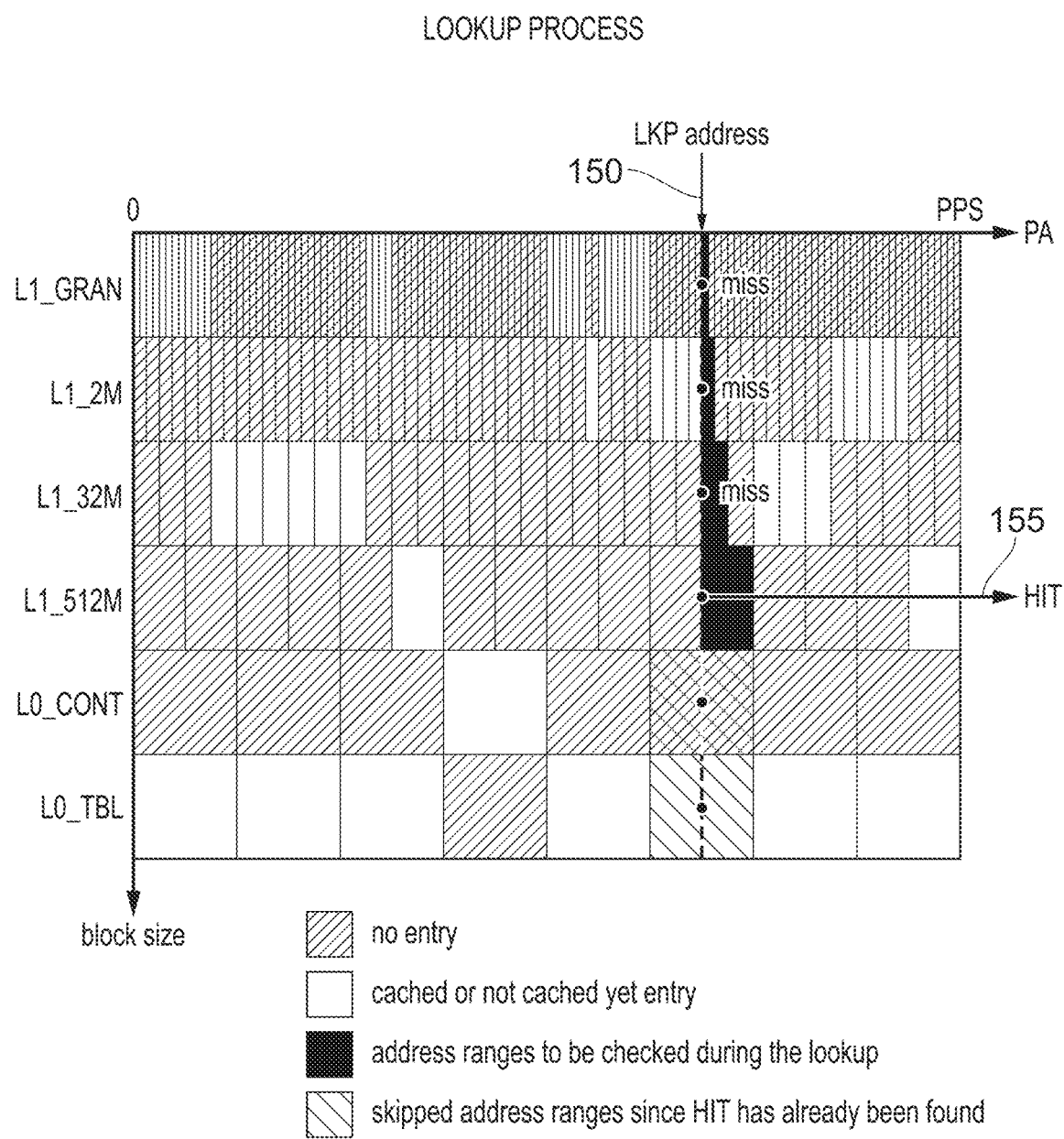
FIGS. 3A and 3B schematically illustrate a lookup process and invalidation process, respectively, that may be performed in one example implementation.

FIG. 3A schematically illustrates a lookup process performed in association with the GPI cache, where the cached data items provide granule protection information. In a system where a GPI cache is employed, a plurality of architectural physical address spaces may be defined (in one specific example as discussed later with reference to FIG. 10 there may be a non-secure physical address space, a secure physical address space, a realm physical address space and a root physical address space), and each of these different architectural physical address spaces may be given access to certain portions of the system physical address space. Virtual to physical address translation may be performed by address translation circuitry in order to translate a target virtual address specified by a memory access request into a target physical address associated with a selected architectural physical address space selected from among a plurality of architectural physical address spaces. The granule protection information for storing in the GPI cache may be obtained by performing a table walk through granule protection tables (GPTs) in memory, and any given item of granule protection information can be arranged to indicate, for at least one granule of physical addresses, which of the plurality of architectural physical address spaces is allowed access to that at least one granule of physical addresses.

In the example implementation shown in FIG. 3A, there are six different types of data items that may be defined within GPTs in memory. A two level walk is defined in such a system as shown in FIG. 3A, involving access to a level 0 (L0) table, and then typically access to a level 1 (L1) table (unless the granule protection information is specified at the L0 level). Five of the six different types provide actual granule protection information for different sized blocks of the physical address space. The smallest sized block of physical address space is referred to as a granule of physical addresses, and the L1_GRAN type of granule protection information may store granule protection information for an individual granule. The size of the granule may in one example implementation be defined by a value held in a control register, and in one particular implementation may be 4, 16 or 64 KB. As shown in FIG. 3A, there are three other types of L1 granule protection information, associated with 2 MB, 32 MB and 512 MB blocks of physical addresses, respectively. As also shown in FIG. 3A, it is possible at the L0 level to provide granule protection information for an even larger block of physical addresses (using the L0_CONT type), and that size may be defined again by a control register, in one particular example implementation the possible sizes being 1, 16, 64 or 512 GB.

The L0_TBL type data item is used to provide a base address (pointer) for a level 1 granule protection table, and is associated with the same block size of physical addresses as the L0 CONT type.

FIG. 3A shows how granule protection information for the entire physical address space may be provided by the five different types of granule protection information discussed above. Further, FIG. 3A shows that L0_TBL pointers are provided for all of the four level 1 types of granule protection information (a L0_TBL data item is not required to identify the L0_CONT granule protection information since that is provided by the L0 GPT).

Hence, it will be appreciated that granule protection information can be provided to cover the entire physical address space, with some of the granule protection information being provided at a fine-grained level and some of it being provided at a number of more coarse-grained levels. It should be noted that whilst FIG. 3A illustrates one example of how the granule protection information may be specified, it does not indicate whether any particular item of granule protection information is cached or not cached.

In the particular example shown, it is assumed that a lookup address 150 is specified, and by default lookups are iteratively performed for each of the possible types (in this case sizes) of granule protection information. It is also assumed that the first lookup is for the L1_GRAN size, and that each subsequent lookup is for the next larger size, this process continuing until either a hit is detected, or a miss is detected for all of the possible sizes. In this case, it is assumed that misses are detected for each of the L1_GRAN, L1_2M and L1_32M types since the associated part of the physical address space is covered by an L1_512M type of granule protection information. It is further assumed that the L1_512 type of granule protection information required for this lookup address has been cached, and accordingly a hit is detected when the associated lookup is performed, as indicated by the arrow 155. Given that a hit has been detected, lookups can be skipped for the two L0 types.

Figure 3B:
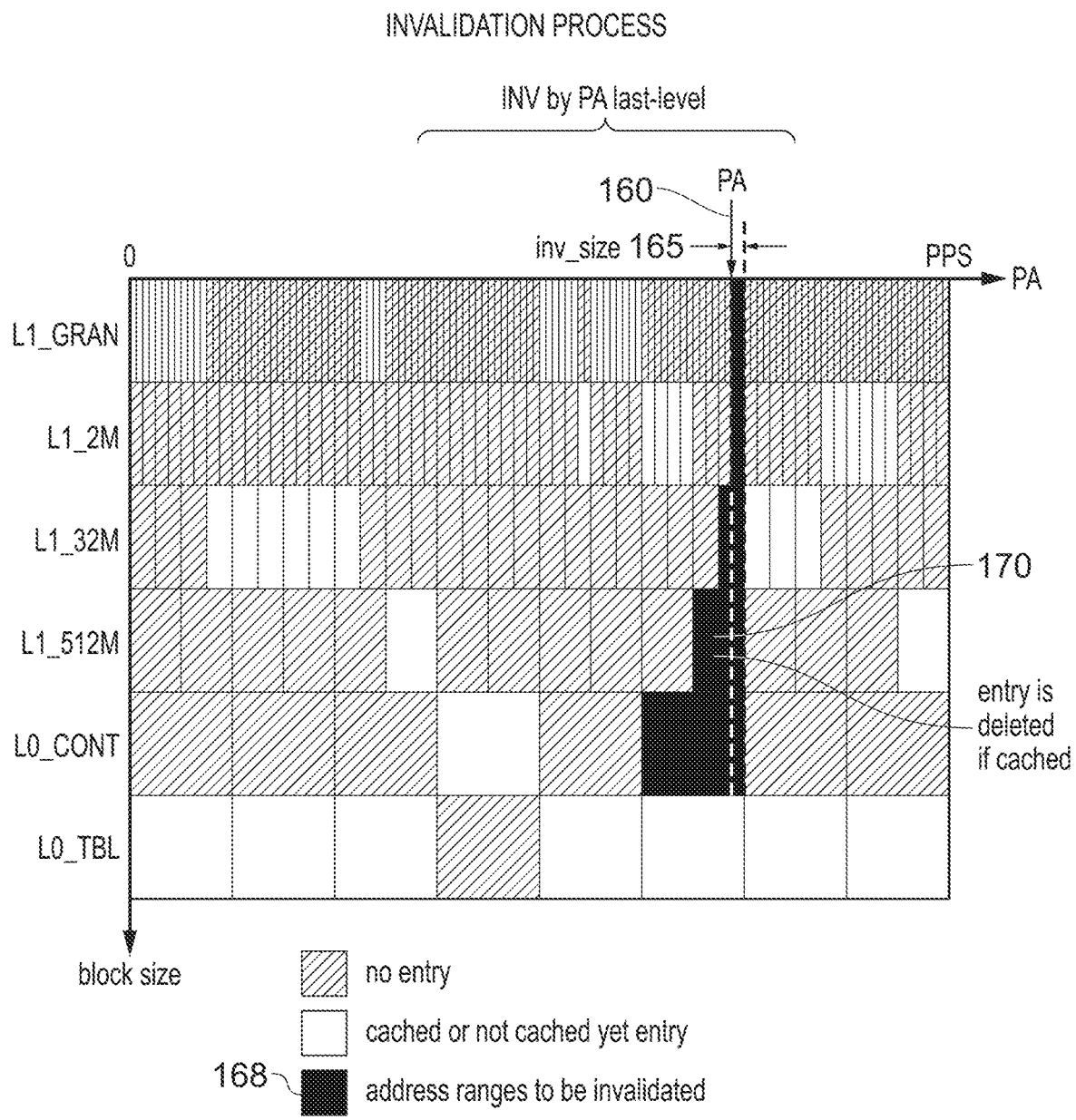

FIG. 3B is a similar figure to FIG. 3A, but provided to illustrate the invalidation process. The layout of the granule protection information across the physical address space is the same as in FIG. 3A, and in this case it is assumed that an invalidation request is received specifying the physical address 160 and the invalidation size 165. It is also assumed that the invalidation request is of the form "invalidate by PA last level", which means that the L0_TBL type is excluded from the invalidation operation. The areas shaded using the shading 168 show the address ranges for each of the five types subjected to the invalidation operation whose associated granule protection information will be invalidated if it has been cached within the cache. As shown, potentially multiple entries storing L1_GRAN type granule protection information could be invalidated given the invalidation address range specified (although in this case that will not happen since there is no L1_GRAN type granule protection information covering physical addresses within the invalidation address range defined by this particular invalidation request). Indeed, given the particular layout of the granule protection information shown in FIGS. 3A and 3B, it is only the granule protection information 170 of the type L1_512M that will be invalidated, if that granule protection information has been cached.

Figure 4A:
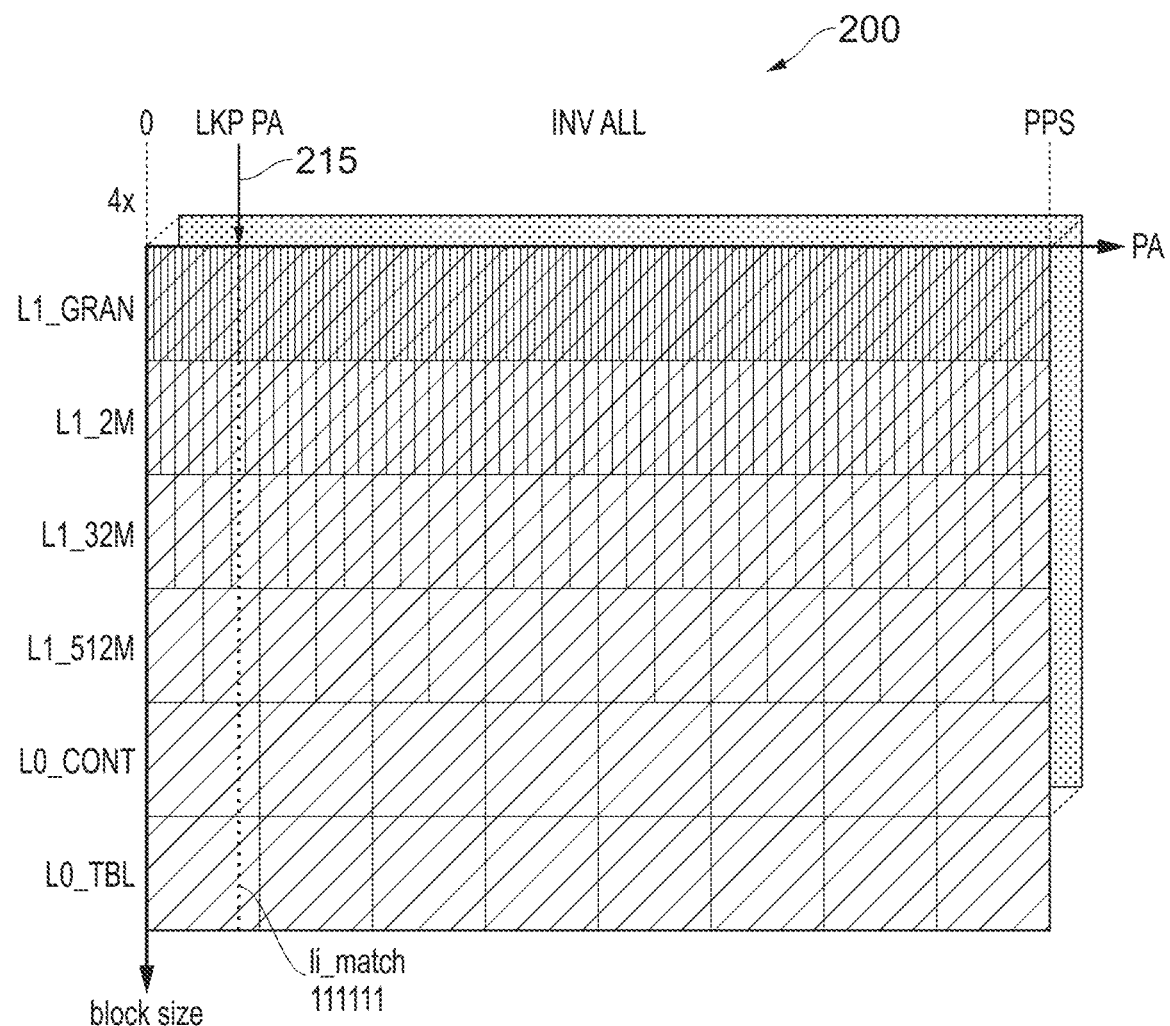
FIGS. 4A to 4C schematically illustrate generation of intersection indication data for three types of invalidation operation that may be supported in one example implementation.
Figure 4B:
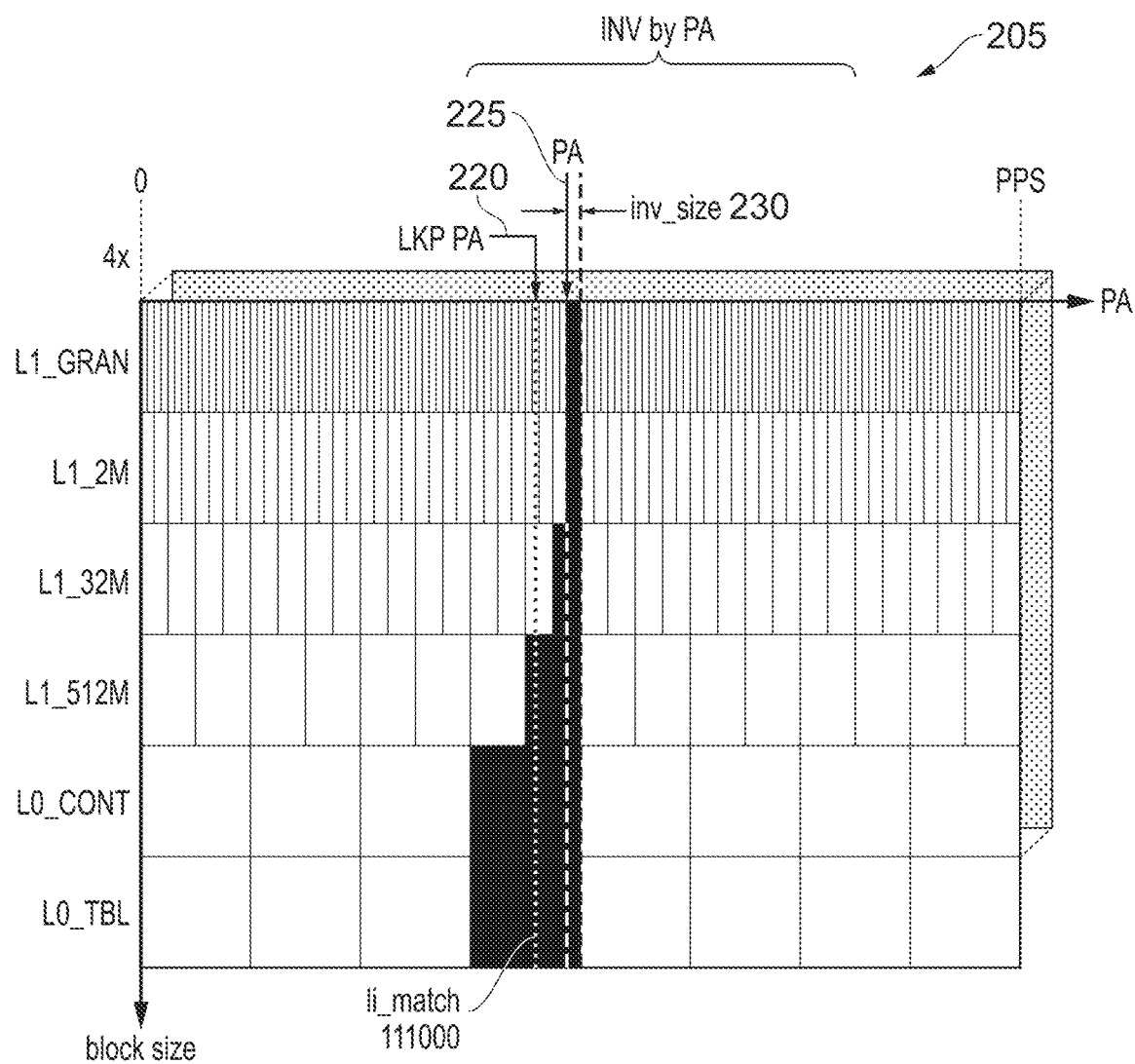
Figure 4C:
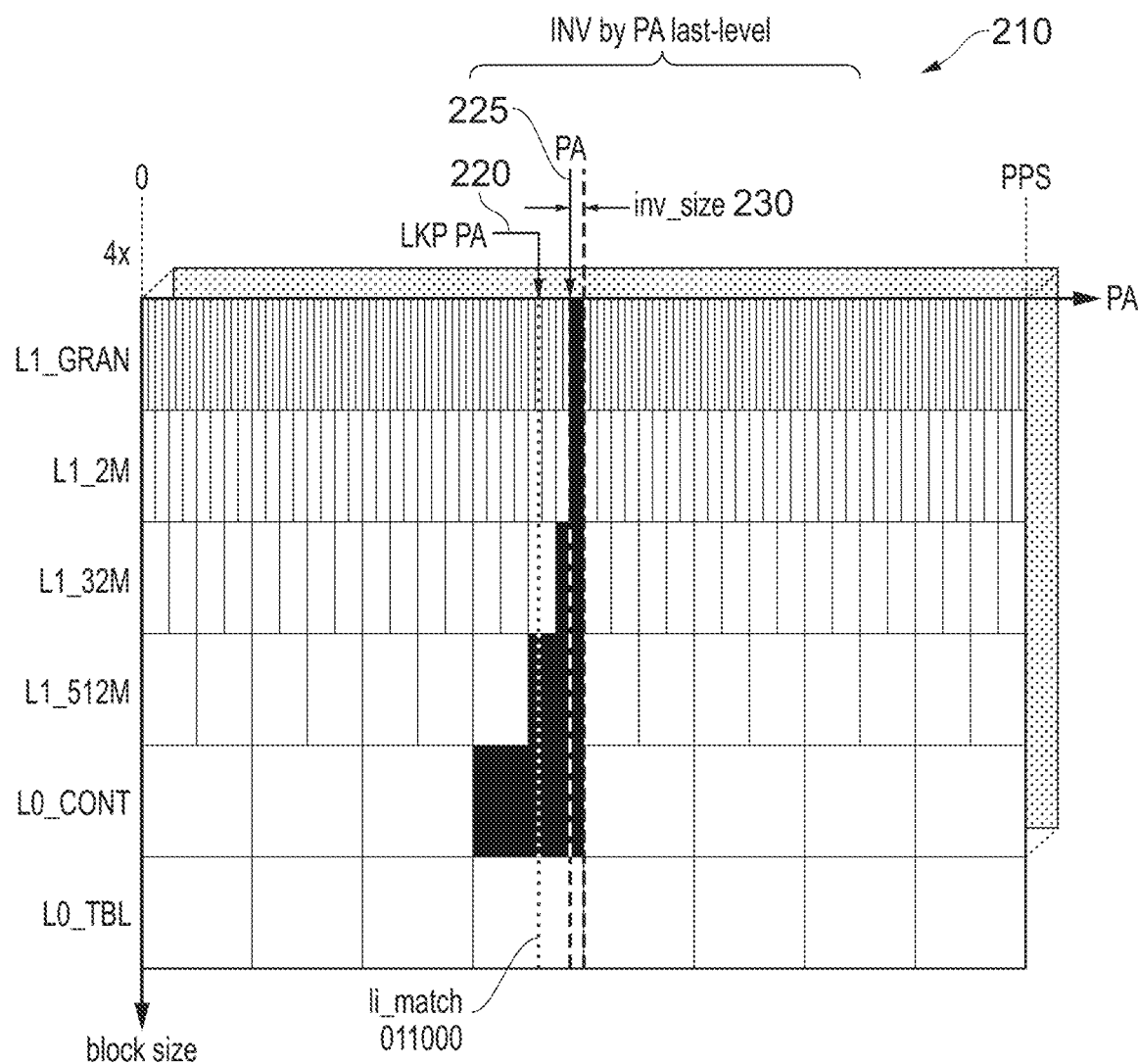

FIGS. 4A to 4C illustrate three different forms of invalidation request that may be specified for performing invalidations of granule protection information, in one example implementation. They also show a particular lookup physical address, and how the intersection indication data is produced for each of the types. In this example, the intersection indication data is termed "li_match" data, and comprises a vector comprising a single bit value for each of the possible types.

In FIG. 4A, it is assumed that the invalidation request is an invalidate all request, meaning that all cached entries will be invalidated irrespective of their type or the address range that they cover. Hence, irrespective of the physical address specified by the look at request (indicated by reference numeral 215 in FIG. 4A) there will be an intersection detected for every type, and hence the li_match vector will be set to all ones. As discussed earlier, this can cause the filtering circuitry 40 to assert a miss for the lookup request without the lookup circuitry 20 needing to perform any lookup operations.

FIG. 4B illustrates another example where the physical address 220 of the lookup request is shown, as is the invalidation physical address 225 and invalidation size 230 specified by the invalidation request. The invalidation request in this example is an invalidate by physical address invalidation request, and applies to all of the six different types. The shaded area shows the potential granule protection information that would be invalidated, were that granule protection information cached, and as can be seen this results in an li_match vector of 111000 given the lookup physical address 220, meaning that there is no intersection detected for the smallest three sizes, but that an intersection is detected for the final three sizes. Hence, the lookup procedure can in this case be performed iteratively for the L1_GRAN type, the L1_2M type and the L1_32M type, the lookup process stopping if a hit is detected. Conversely, if no hit is detected after performing lookups for the above three types, then a miss can be asserted, since there is no need to perform lookups for the final three types, given that any data item that could have resulted in a hit based on those types will be invalidated by the invalidation request.

Finally, FIG. 4C shows another example where it is assumed that the lookup physical address, the invalidation physical address and the invalidation size are the same as discussed earlier with reference to FIG. 4B, but that the invalidation request is of the form "invalidate by PA last-level", and hence the L0_TBL type is excluded from the invalidation operation. As a result, the li_match vector takes the form 011000, meaning that lookups can be performed for each of the smallest three types/sizes, and in the event that a hit is not detected for any of those lookups, a lookup can also then be performed for the L0 TBL type.

As mentioned earlier, if the lookup circuitry also has available to it the type presence information, then that type presence information can be combined with the intersection indication data to determine which lookups to perform. Hence, considering the example of FIG. 4C, if the type presence information indicates that the cache does not currently store any data items of the type L1_GRAN, then that type can be excluded from the lookup process as well.

Figure 5:
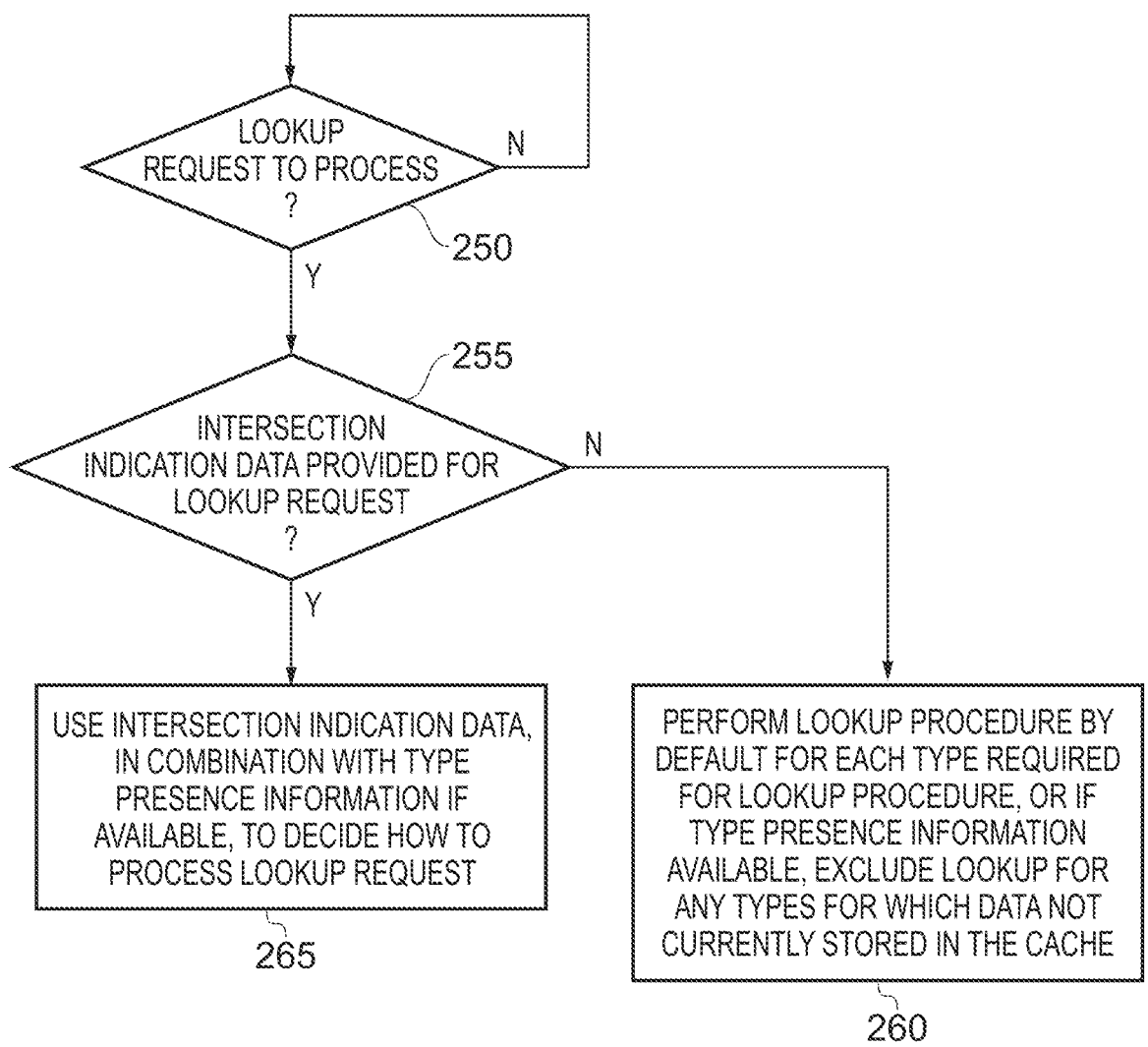
FIG. 5 is a flow diagram illustrating the operation of the lookup circuitry in accordance with one example implementation.

FIG. 5 is a flow diagram illustrating the operation of the lookup circuitry 20 of FIG. 1 in accordance with one example implementation. At step 250, it is determined whether the lookup circuitry has a lookup request to process. The lookup circuitry may provide a number of slots for receiving pending lookup requests, and will select a pending lookup request from a slot at step 250 if there are one or more pending lookup requests to process.

Once it is determined at step 250 that there is a lookup request to process, then it is determined at step 255 whether intersection indication data has been provided for that lookup request, as discussed earlier this intersection indication data being forwarded to the lookup circuitry in association with a lookup request when the apparatus is operating in the filtering mode of operation due to a pending invalidation request being processed.

If no intersection indication data is provided for the lookup request, then the process proceeds to step 260 where a lookup procedure is performed, by default this involving performing a lookup for each type that should be checked against in order to fully process the lookup request. As mentioned earlier, in one example implementation the lookup procedure may be implemented by performing iterative lookups for each of the relevant types until either a hit is detected, or a lookup has been performed for all of those types without a hit been detected. As indicated by step 260, if type presence information is available, any types for which data is not currently stored in the cache can be excluded from the lookup procedure.

If at step 255 it is determined that intersection indication data is provided for the lookup request, then the process proceeds to step 265, where the intersection indication data is used, in combination with the type presence information if available, in order to decide how to process the lookup request.

Figure 6:
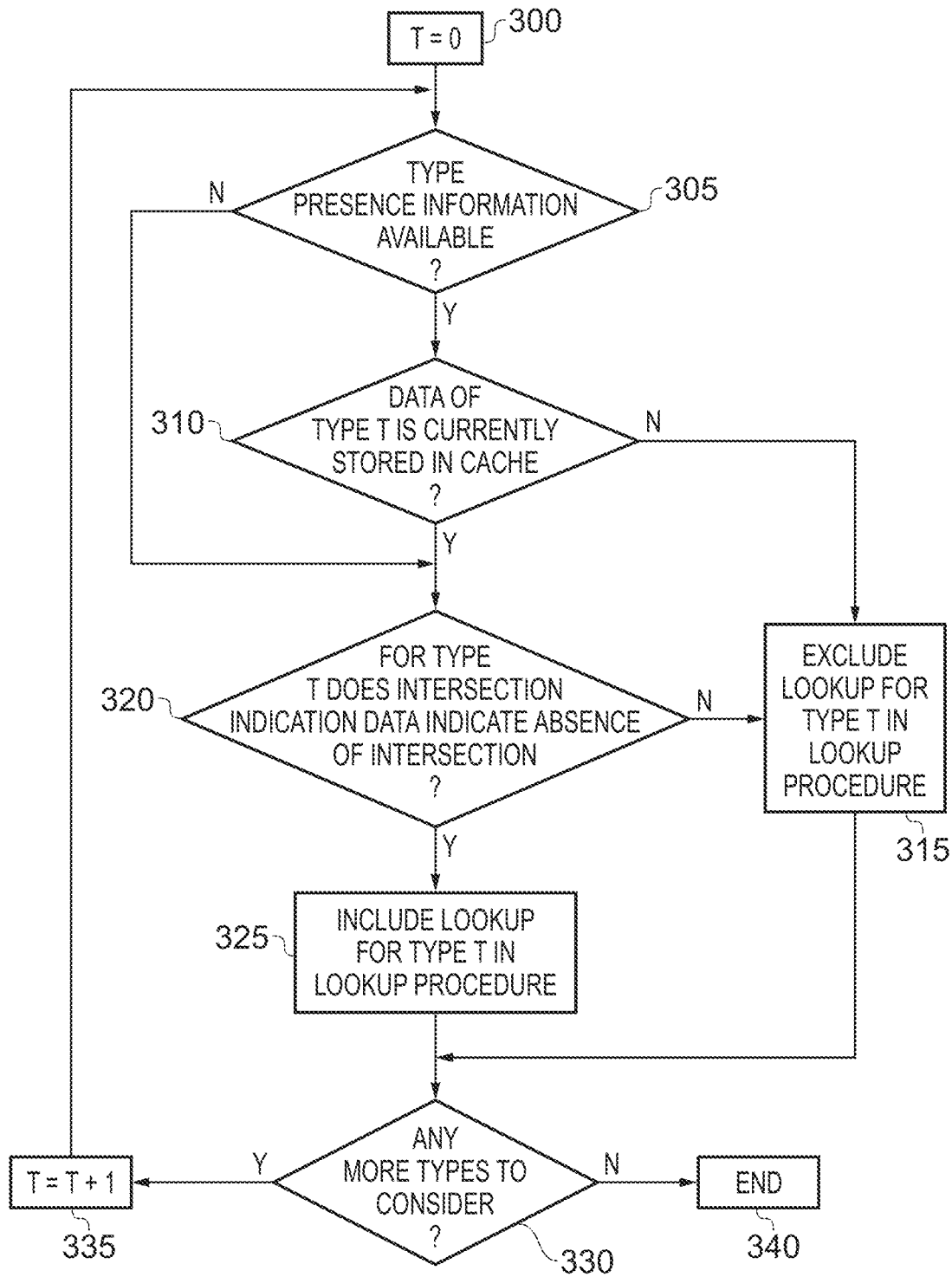
FIG. 6 is a flow diagram illustrating in more detail a process that may be performed in order to implement step 265 of FIG. 5, in accordance with one example implementation.

FIG. 6 is a flow diagram illustrating a series of steps that may be performed in order to implement step 265 of FIG. 5, in accordance with one example implementation. At step 300, a parameter T is set equal to 0, and it is then determined at step 305 whether type presence information is available or not. If it is, then it is determined at step 310 whether data of type T is currently stored within the cache or not. If not, then the lookup procedure can be arranged at step 315 to exclude a lookup for type T. The process then proceeds to step 330.

However, if it is determined at step 310 that data for type T is currently stored in the cache, or if it is determined at step 305 that there is no type presence information available, the process proceeds to step 320, where it is determined whether, for type T, the intersection indication data indicates the absence of an intersection. If it does not, then in the example implementation of FIG. 6 this indicates that a presence of an intersection has been detected for type T, and accordingly the process proceeds to step 315 where the lookup procedure excludes a lookup for type T. However, if the intersection indication data does indicate an absence of an intersection for type T, then the process proceeds to step 325 where the lookup procedure includes a lookup for type T. The process then proceeds to step 330.

At step 330, it is determined whether there are any more types to consider, and if so the parameter T is incremented at step 335, and the process returns to step 305. Once it is determined at step 330 that there are no more types to consider, then the process ends at step 340.

Figure 7:
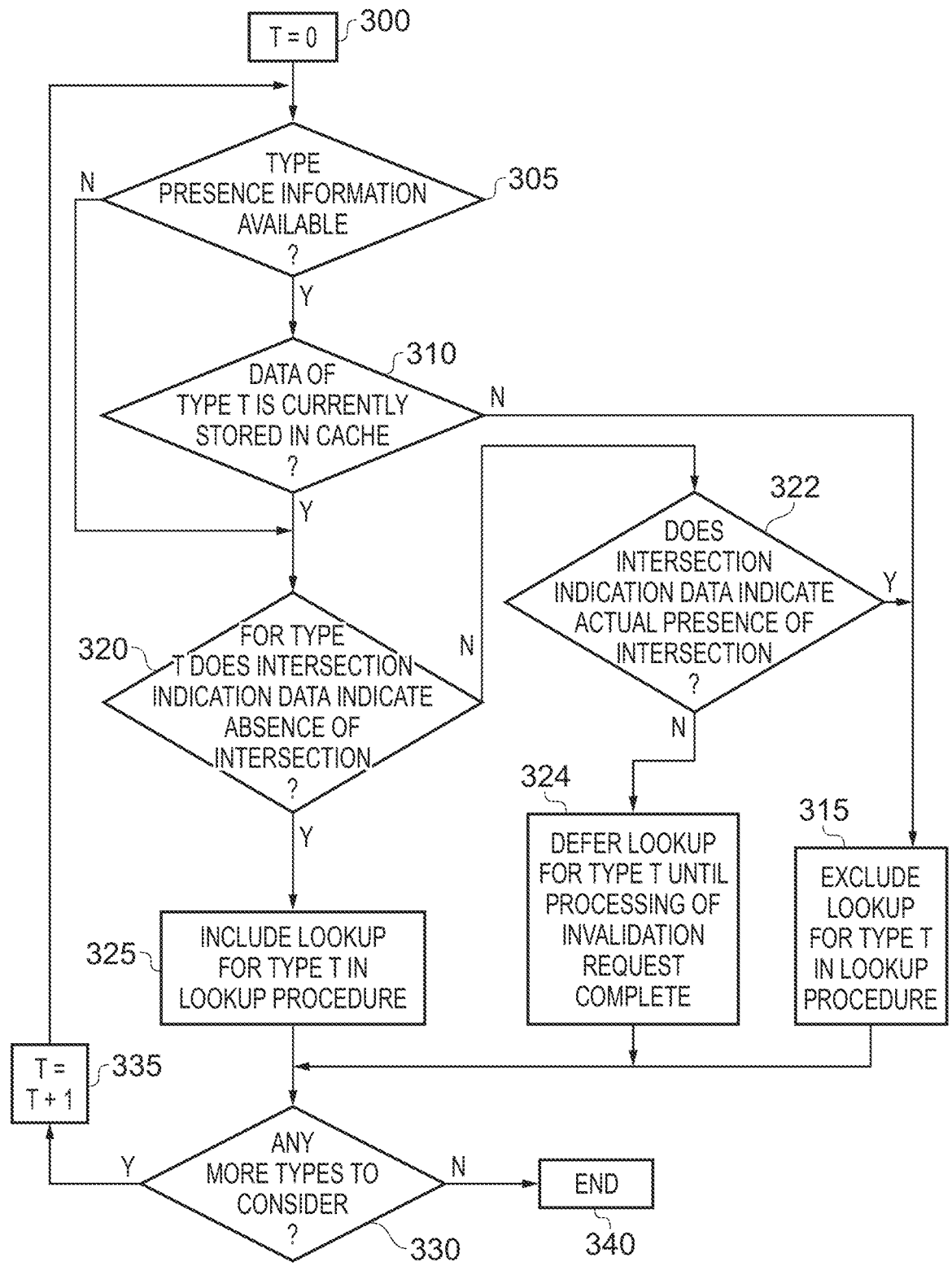
FIG. 7 is a flow diagram illustrating in more detail a process that may be performed in order to implement step 265 of FIG. 5, in accordance with another example implementation.

In the example of FIG. 6, it is assumed that the intersection indication data will either indicate a definite absence of an intersection or a definite presence of an intersection, and hence the filtering approach described in FIG. 6 may be referred to as a precise filtering implementation. However, depending on the type of invalidation operation performed, and in particular the invalidation parameters available to the filtering circuitry, it may be the case that a precise implementation of the filtering is not available, and that the intersection indication data may instead, in some instances, indicate potential presence of an intersection. Such an approach is illustrated in FIG. 7. To assist in comparison of FIG. 7 with FIG. 6, the same reference numerals have been used in FIG. 7 for the steps that have already been described with reference to FIG. 6.

As can be seen, if at step 320 it is identified that the intersection indication data does not indicate the absence of an intersection, it is then determined at step 322 whether the intersection indication data indicates the actual presence of an intersection. If so, the process proceeds to step 315, in the same way as discussed earlier when describing FIG. 6. However, if the intersection indication data does not indicate an actual presence of an intersection at step 322, then this means that the intersection indication data indicates a potential presence of an intersection. There are various ways in which this scenario can be dealt with, but in the example of FIG. 7 the process proceeds to step 324 where the lookup procedure is deferred for type T until the processing of the invalidation request is complete. The process then continues to step 330.

In another variant, it may be determined that as soon as a potential presence of an intersection has been detected, the entire lookup procedure (i.e. for all types) is deferred until the invalidation request has been completed. Further, whilst in FIG. 7 the intersection indication data may indicate an actual absence of an intersection, an actual presence of an intersection, or a potential presence of an intersection, in an alternative implementation not all three variants of intersection information may be available. For example, it may be the case in one example implementation that the intersection indication data indicates only an absence of an intersection or a potential presence of an intersection.

Figure 8:
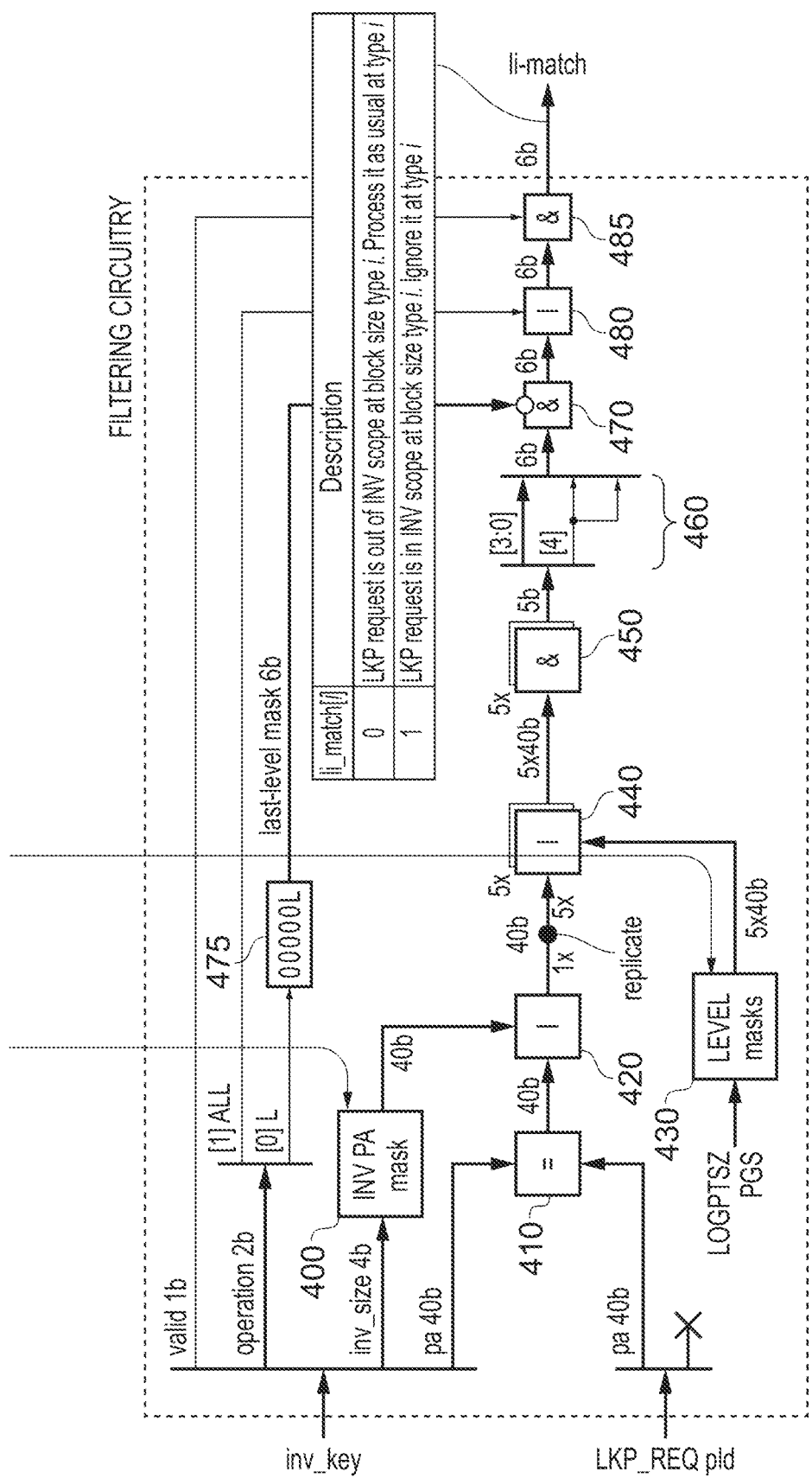
FIG. 8 is a block diagram illustrating the filtering circuitry in accordance with one example implementation.

FIG. 8 is a block diagram illustrating the implementation of the filtering circuitry in accordance with one specific example implementation. In this example the invalidation parameters passed to the filtering circuitry from the invalidation circuitry are labelled "inv_key" and comprise the invalidation physical address, invalidation range (inv_size) and the form of invalidation operation. The INV PA mask block 400 selects one of the 10 fixed invalidation PA masks 405 illustrated in FIG. 8, depending on the value of the 4-bit invalidation size information associated with the invalidation request. As shown in FIG. 8, the invalidation PA mask is a 40-bit vector of zeros or ones.

The lookup request provides a physical address, and the comparator block 410 performs a bit-by-bit comparison of the 40-bit lookup address and the 40-bit invalidation address, outputting a 40-bit compare vector to the OR block 420. The OR block 420 performs a logical OR operation of the selected 40-bit invalidation PA mask and the 40-bit compare vector in order to output a 40-bit result vector to the OR block 440. The level masks block 430 outputs five 40-bit level masks chosen from the set of level masks 435 shown in FIG. 8. As is apparent from FIG. 8, the level masks for 2, 32, and 512 MB are fixed, but the level masks for the GRAN and CONT/TBL types depends on values of static registers that identify the size associated with those types.

The OR block 440 performs vector-by-vector bit-by-bit ORing of the five 40-bit level masks and the 40-bit result vector output from the component 420 (which is replicated five times as an input to the block 440), this resulting in the generation of five 40-bit output signals that are passed to the AND circuitry 450. The circuitry 450 performs reduction ANDing for each received 40-bit vector (such that each 40-bit vector is reduced to 1-bit), and as a result five bits of information are output from the circuitry 450. As shown by the wiring path 460, bit 4 of the output is replicated to produce output bits 4 and 5, and as a result a 6-bit value is forwarded to the AND circuitry 470.

The block 475 outputs a 6-bit last-level operation mask whose value depends on the form of operation specified by the invalidation request. Block 470 then performs a bit-by-bit NOT-ANDing of the 6-bit result output from wiring path 460 and the selected 6-bit last-level operation mask output from block 475. Block 480 then performs a logical OR-ing of the 6-bit result output by block 470 with bit [1] (ALL) of the operation of the invalidation request. In combination, the components 470, 475, 480 mask either bit [5] or all bits of the result output from the element 460, depending on the form of operation specified by the invalidation request.

Component 485 then performs a logical AND-ing of the 6-bit result from element 480 with the valid bit provided as part of the invalidation parameters information. A valid bit having a logic one value indicates that there is currently an outstanding invalidation request being processed. The output from the component 485 is then a 6-bit li_match vector that provides the earlier discussed intersection indication data used by the lookup circuitry to control the lookups performed in order to process the lookup request.

Figure 9:
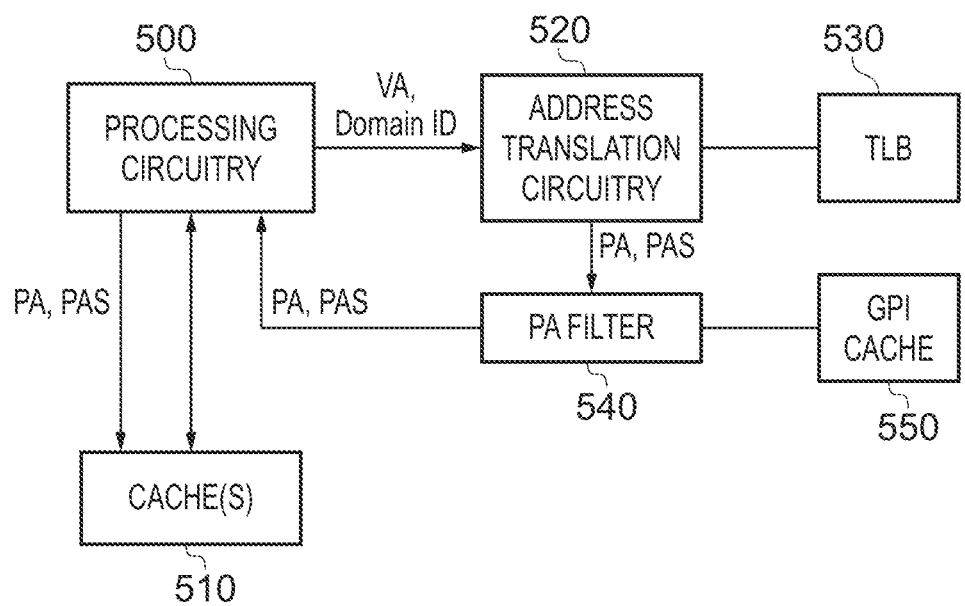
FIG. 9 is a block diagram schematically illustrating a system in which the present techniques may be employed, in accordance with one example implementation.

FIG. 9 is a block diagram illustrating an example system in which the techniques described herein may be utilised. Processing circuitry 500 is provided for performing data processing operations in response to instructions, with reference to data stored in registers (not shown). During performance of such data processing operations, memory accesses may need to be performed. The processing circuitry 500 may be capable of issuing memory access requests specifying a virtual address (VA) identifying the addressable location to be accessed and a domain identifier (Domain ID or 'security state') identifying the current domain (in one particular example implementation the domain can either be non-secure, secure, realm or root). Address translation circuitry 520 (e.g. a memory management unit (MMU)) translates the virtual address into a physical address (PA) through one of more stages of address translation based on page table data defined in page table structures stored in the memory system. A translation lookaside buffer (TLB) 530 acts as an address translation cache for caching some of that page table information for faster access than if the page table information had to be fetched from memory each time an address translation is required. In this example, as well as generating the physical address, the address translation circuitry 520 also identifies a physical address space (PAS) associated with the access request and outputs a physical address space (PAS) identifier identifying that physical address space.

A PAS filter 540 is used to check, based on the translated physical address and the PAS identifier, whether that physical address is allowed to be accessed within the specified physical address space identified by the PAS identifier. This check is based on granule protection information (GPI) stored in a granule protection table structure stored within the memory system. The granule protection information may be cached within a granule protection information cache 550, similar to a caching of page table data in the TLB 530. While the granule protection information cache 550 is shown as a separate structure from the TLB 530 in the example of FIG. 9, in other examples these types of caches could be combined into a single lookup cache structure. The granule protection information defines information restricting the physical address spaces from which a given physical address can be accessed, and based on this lookup the PAS filter 540 determines whether to allow the memory access request to proceed to be issued to one or more caches 510 and/or lower levels of cache/main memory. If the specified PAS for the memory access request is not allowed to access the specified physical address, then the PAS filter 540 blocks the transaction and may signal a fault.

Figure 10:
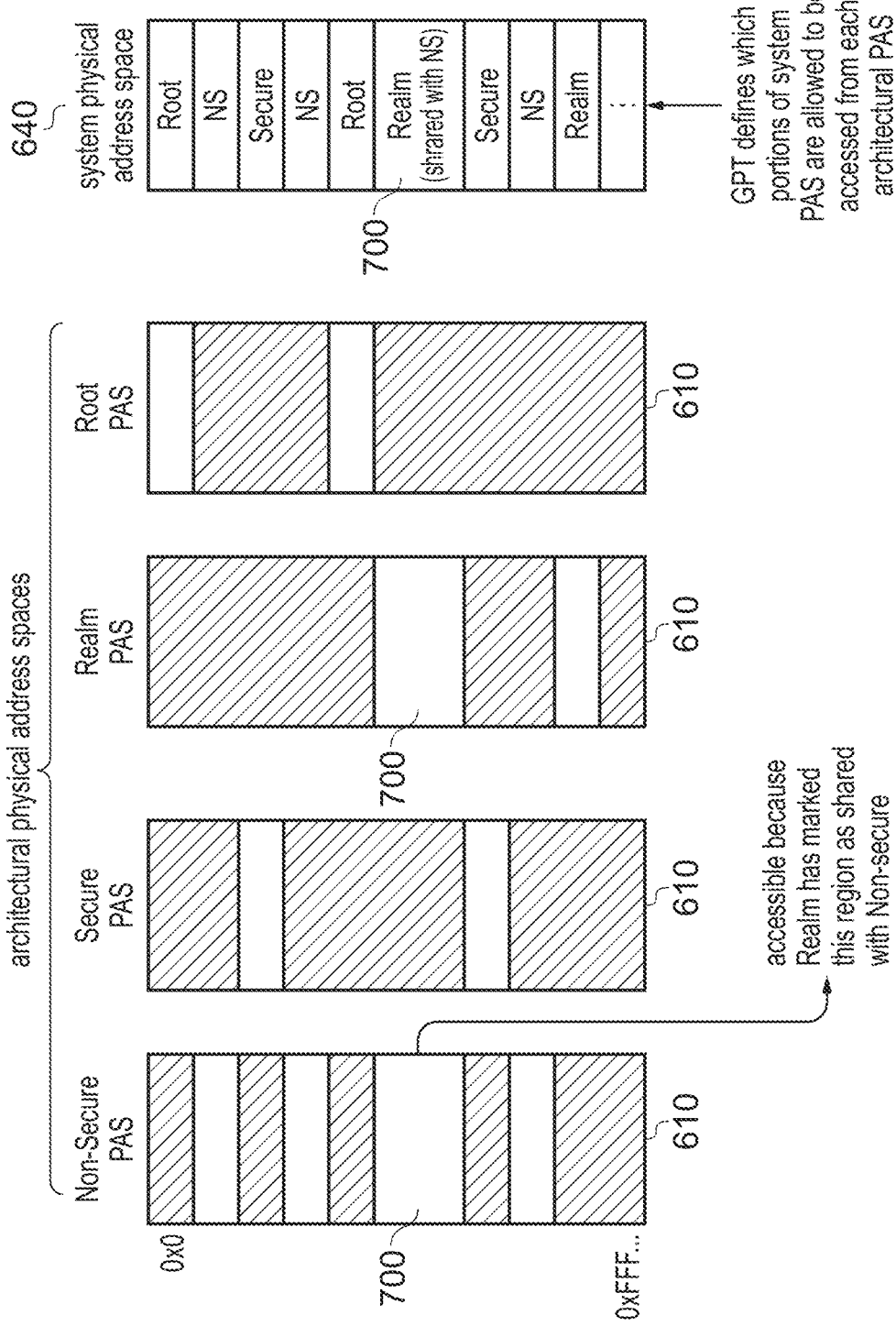
FIG. 10 illustrates an example of partitioning the effective hardware physical address space so that different architectural physical address spaces have access to respective portions of the system physical address space.

FIG. 10 illustrates how the system physical address space 640 can be divided, using a granule protection table, into chunks allocated for access within a particular architectural physical address space 610 (each of the earlier discussed domains can have its own respective architectural physical address space). The granule protection table (GPT) defines which portions of the system physical address space 640 are allowed to be accessed from each architectural physical address space 610. For example the GPT may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 10 the region 700 of the realm PAS is defined in the GPT as being assigned to the realm domain, so normally it would be inaccessible from the non-secure domain because the non-secure domain cannot select the realm PAS for its access requests. As the non-secure domain cannot access the realm PAS, then normally non-secure code could not see the data in region 700. However, if the realm temporarily wishes to share some of its data in its assigned regions of memory with the non-secure domain then it could request that monitor code operating in the root domain updates the GPT to indicate that region 700 is to be shared with the non-secure domain, and this may make region 700 also be accessible from the non-secure PAS as shown on the left hand side of FIG. 10, without needing to change which domain is the assigned domain for region 700. If the realm domain has designated a region of its address space as shared with the non-secure domain, then although the memory access requests targeting that region which are issued from the non-secure domain may initially specify the non-secure PAS, the PAS filter 540 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

The techniques described herein may for example be employed within either the GPI cache 550, the TLB 530, or indeed within both. Within the GPI cache 550, the invalidation requests received by that cache will typically be physical address based invalidation requests, and typically the earlier described precise filtering implementation may be able to be performed. In particular, in one example implementation, each invalidation request received by the GPI cache may specify a physical address, an invalidation size, and an indication of the form of invalidation operation to be performed, and the filtering circuitry 40 of FIG. 1 is able, whilst such an invalidation request is outstanding, to perform a filtering operation in order to produce intersection indication data identifying, for each type that is to be considered during the lookup procedure, whether there is an absence of an intersection or a presence of an intersection, with the lookup procedure being controlled accordingly.

With regards to the TLB 530, whether a precise filtering or an imprecise filtering implementation can be used may depend on the type of invalidation request received by the TLB 530. There are a wide variety of different invalidation operations that may be performed in respect of the TLB, such invalidation operations also being referred to as translation maintenance operations (TMOs). Some TMOs may be physical address based, where a physical address and an invalidation size are provided. In such cases, it may be possible to perform a precise filtering. However, other TMOs may be virtual address based, and in those cases an imprecise filtering implementation may be used. For virtual address (VA) based TMOs, filtering may be based on context and address, translation granule (TG) size information and level hint information if available. As discussed earlier, context information may be used to define the scope of entries to be invalidated, translation granule (TG) size information may identify the translation granule size for the address translations that are to be invalidated (with the translation granule size in bytes being used in determining the address range), and translation table level hint information may indicate the lookup level of the translation table walk process that holds the final level descriptor used to determine a physical address from a corresponding virtual address. Often the final level descriptor is a leaf descriptor provided at a final level of the page table walk, but in some cases a block descriptor (at a non-final level of the page table walk) may form the final level descriptor (typically such a block descriptor being associated with a larger address range than a leaf descriptor).

In the event of VA based TMOs that do not have TG or level hint information, the address overlap check may be crude (for example matching on the upper bits excluding bits corresponding to the maximum page size), and in the event of a match this may be interpreted as a potential intersection. In that case it may be appropriate to stall the lookup until the TMO completes, as it is still possible that the performance of the lookup after the invalidation completes may result in a hit. For range-based TMOs, it may be harder to determine overlap, and it may be determined to filter based on just context for such TMOs, where a match in the context will result in a stall of the lookup request until the invalidation request has been processed.

Figure 11:
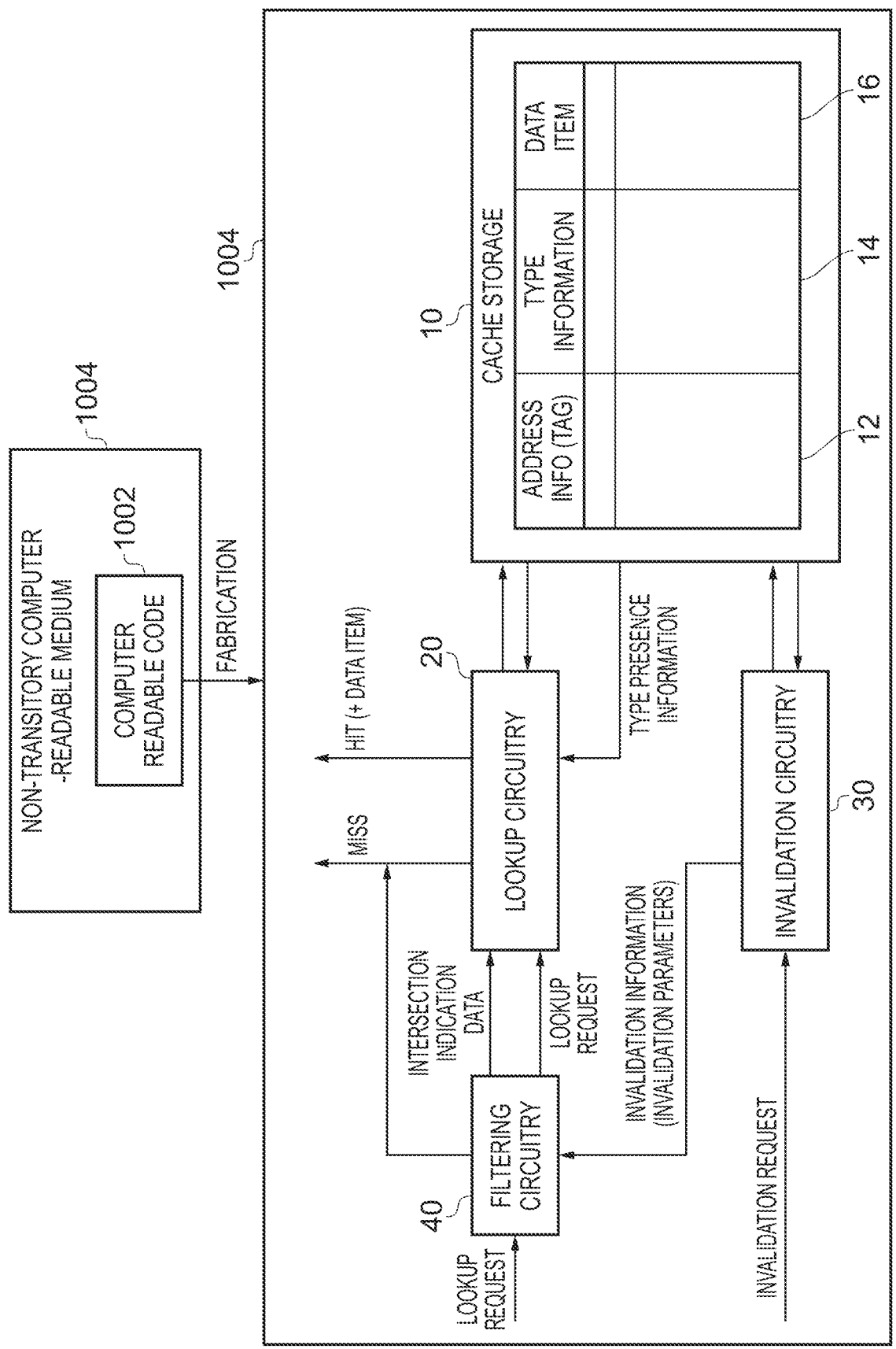
FIG. 11 schematically illustrates a non-transitory computer-readable medium comprising computer readable code for fabrication of an apparatus according to various configurations of the present techniques.

FIG. 11 schematically illustrates a non-transitory computer-readable medium comprising computer readable code for fabrication of an apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 may in one example implementation comprise the cache storage 10, lookup circuitry 20, invalidation circuitry 30 and filtering circuitry 40 as described in FIG. 1.

It will be appreciated that the techniques described herein enable an improvement in performance, and a reduction in power consumption, when seeking to process lookup requests in the presence of a pending invalidation request. In particular, the described techniques enable some processing of lookup requests to take place whilst an invalidation request is in the process of being handled, since the intersection indication data can be used to determine whether performance of the lookup request for one or more types should definitely be treated as a miss (due to the fact that the data in question will be invalidated by the performance of the invalidation request) or whether the performance of the lookup request for one or more types may potentially yield valid hit data (and hence should not merely be treated as a miss). In addition to being able to allow some handling of lookup requests in the presence of a pending invalidation request, such a technique may also have a positive effect on the execution of the invalidation procedure, since unnecessary lookup requests are filtered and ignored, giving the apparatus more chance to perform the invalidation quicker.

Other example arrangements are set out in the following clauses:

1. An apparatus comprising:
    a cache storage having a plurality of entries for storing data items, wherein each entry is arranged to have type information associated therewith to indicate a type associated with the data item stored in that entry, and wherein for each entry the type is one of multiple supported types for which the cache storage is enabled to store data items;
    lookup circuitry to process lookup requests, wherein the lookup circuitry is responsive to a given lookup request providing an address indication to perform a lookup procedure to determine whether a hit is detected indicating that an entry of the cache storage stores a data item associated with the address indication, by default the lookup circuitry being arranged to perform the lookup procedure for a given subset of the multiple supported types;
    invalidation circuitry to process an invalidation request specifying invalidation parameters used to determine an invalidation address range and invalidation type information, in order to invalidate any data items held in the cache storage that are both associated with the invalidation address range and have an associated type that is indicated by the invalidation type information; and
    filtering circuitry arranged, whilst processing of the invalidation request is yet to be completed, to perform a filtering operation for a received lookup request, in order to determine, in dependence on the address indication provided by the received lookup request and one or more of the invalidation parameters of the invalidation request, intersection indication data identifying, for a given type in the given subset, whether an intersection is considered to exist between any entries that would be accessed during performance of the lookup procedure for the received lookup request for the given type and any entries that will be invalidated during processing of the invalidation request, and to control operation of the lookup circuitry in dependence on the intersection indication data.

2. An apparatus as in Clause 1, wherein when, for the given type, the intersection indication data indicates absence of an intersection, the lookup circuitry is enabled to perform the lookup procedure for the received lookup request for the given type, and to generate a hit indication in response to the hit being detected, without waiting for the processing of the invalidation request to be completed.

3. An apparatus as in Clause 1 or Clause 2, wherein when, for the given type, the intersection indication data indicates presence of an intersection, the lookup circuitry is inhibited from performing the lookup procedure for the received lookup request for the given type.

4. An apparatus as in Clause 3, wherein when the intersection indication data identifies presence of an intersection for every type in the given subset, the filtering circuitry is arranged to cause a miss indication to be generated for the received lookup request.

5. An apparatus as in any preceding clause, wherein:
    when, for the given type, the intersection indication data indicates potential presence of an intersection, the lookup circuitry is arranged to defer performing the lookup procedure for the received lookup request for the given type until processing of the invalidation request has been completed.

6. An apparatus as in any preceding clause, wherein the intersection indication data takes the form of a vector providing an intersection indication value for at least each type in the given subset, each intersection indication value identifying whether the intersection is considered to exist for the associated type.

7. An apparatus as in any preceding clause, wherein:
the cache storage is arranged to generate type presence information identifying each type in at least the given subset for which the cache storage currently has one or more entries storing associated data items, and the lookup circuitry is arranged to control performance of the lookup procedure in dependence on both the type presence information and the intersection indication data.

8. An apparatus as in Clause 7, wherein the type presence information takes the form of a vector providing a presence indication value for at least each type in the given subset, each presence indication value identifying whether the cache storage has at least one entry storing data items of the associated type.

9. An apparatus as in any preceding clause, wherein:
for a given entry the type information indicates a size of a match address range for the associated data stored in that given entry, and for the hit to be detected for the given entry the address indication provided by the received lookup request is required to identify an address falling within the match address range.

10. An apparatus as in Clause 9, wherein the invalidation circuitry is arranged, when processing the invalidation request, to invalidate the data item held in a given entry of the cache storage when the given entry stores a data item having an associated type identified by the invalidation type information and the invalidation address range at least partly overlaps the match address range.

11. An apparatus as in any preceding clause, wherein a given data item provides access control information used to constrain access to addresses associated with that given data item.

12. An apparatus as in Clause 11, further comprising:
address translation circuitry to translate a target virtual address specified by a memory access request into a target physical address associated with a selected physical address space selected from among a plurality of physical address spaces; and
the given data item stored in the cache storage comprises granule protection information indicating, for at least one granule of physical addresses, which of the plurality of physical address spaces is allowed access to the at least one granule of physical addresses.

13. An apparatus as in Clause 12, wherein the number of granules of physical addresses associated with a given data item is dependent on the type associated with the given data item.

14. An apparatus as in any of clauses 1 to 10, wherein the cache storage comprises an address translation cache, and a given data item comprises address translation data for use when converting a virtual address into a corresponding physical address of a memory system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a cache storage having a plurality of entries for storing data items, wherein each entry is arranged to have type information associated therewith to indicate a type associated with the data item stored in that entry, and wherein for each entry the type is one of multiple supported types for which the cache storage is enabled to store data items;
lookup circuitry to process lookup requests, wherein the lookup circuitry is responsive to a given lookup request providing an address indication to perform a lookup procedure to determine whether a hit is detected indicating that an entry of the cache storage stores a data item associated with the address indication, by default the lookup circuitry being arranged to perform the lookup procedure for a given subset of the multiple supported types;
invalidation circuitry to process an invalidation request specifying invalidation parameters used to determine an invalidation address range and invalidation type information, in order to invalidate any data items held in the cache storage that are both associated with the invalidation address range and have an associated type that is indicated by the invalidation type information; and
filtering circuitry arranged, whilst processing of the invalidation request is yet to be completed, to perform a filtering operation for a received lookup request, in order to determine, in dependence on the address indication provided by the received lookup request and one or more of the invalidation parameters of the invalidation request, intersection indication data identifying, for a given type in the given subset, whether an intersection is considered to exist between any entries that would be accessed during performance of the lookup procedure for the received lookup request for the given type and any entries that will be invalidated during processing of the invalidation request, and to control operation of the lookup circuitry in dependence on the intersection indication data.

2. An apparatus as claimed in claim 1, wherein when, for the given type, the intersection indication data indicates absence of an intersection, the lookup circuitry is enabled to perform the lookup procedure for the received lookup request for the given type, and to generate a hit indication in response to the hit being detected, without waiting for the processing of the invalidation request to be completed.

3. An apparatus as claimed in claim 1, wherein when, for the given type, the intersection indication data indicates presence of an intersection, the lookup circuitry is inhibited from performing the lookup procedure for the received lookup request for the given type.

4. An apparatus as claimed in claim 3, wherein when the intersection indication data identifies presence of an intersection for every type in the given subset, the filtering circuitry is arranged to cause a miss indication to be generated for the received lookup request.

5. An apparatus as claimed in claim 1, wherein:
when, for the given type, the intersection indication data indicates potential presence of an intersection, the lookup circuitry is arranged to defer performing the lookup procedure for the received lookup request for the given type until processing of the invalidation request has been completed.

6. An apparatus as claimed in claim 1, wherein the intersection indication data takes the form of a vector providing an intersection indication value for at least each type in the given subset, each intersection indication value identifying whether the intersection is considered to exist for the associated type.

7. An apparatus as claimed in claim 1, wherein:
the cache storage is arranged to generate type presence information identifying each type in at least the given subset for which the cache storage currently has one or more entries storing associated data items, and the lookup circuitry is arranged to control performance of the lookup procedure in dependence on both the type presence information and the intersection indication data.

8. An apparatus as claimed in claim 7, wherein the type presence information takes the form of a vector providing a presence indication value for at least each type in the given subset, each presence indication value identifying whether the cache storage has at least one entry storing data items of the associated type.

9. An apparatus as claimed in claim 1, wherein:
for a given entry the type information indicates a size of a match address range for the associated data stored in that given entry, and for the hit to be detected for the given entry the address indication provided by the received lookup request is required to identify an address falling within the match address range.

10. An apparatus as claimed in claim 9, wherein the invalidation circuitry is arranged, when processing the invalidation request, to invalidate the data item held in a given entry of the cache storage when the given entry stores a data item having an associated type identified by the invalidation type information and the invalidation address range at least partly overlaps the match address range.

11. An apparatus as claimed in claim 1, wherein a given data item provides access control information used to constrain access to addresses associated with that given data item.

12. An apparatus as claimed in claim 11, further comprising:
address translation circuitry to translate a target virtual address specified by a memory access request into a target physical address associated with a selected physical address space selected from among a plurality of physical address spaces; and
the given data item stored in the cache storage comprises granule protection information indicating, for at least one granule of physical addresses, which of the plurality of physical address spaces is allowed access to the at least one granule of physical addresses.

13. An apparatus as claimed in claim 12, wherein the number of granules of physical addresses associated with a given data item is dependent on the type associated with the given data item.

14. An apparatus as claimed in claim 1, wherein the cache storage comprises an address translation cache, and a given data item comprises address translation data for use when converting a virtual address into a corresponding physical address of a memory system.

15. A method of operating a cache storage, comprising:
providing the cache storage with a plurality of entries for storing data items, wherein each entry is arranged to have type information associated therewith to indicate a type associated with the data item stored in that entry, and wherein for each entry the type is one of multiple supported types for which the cache storage is enabled to store data items;
performing, in response to a given lookup request providing an address indication, a lookup procedure to determine whether a hit is detected indicating that an entry of the cache storage stores a data item associated with the address indication, by default the lookup procedure being performed for a given subset of the multiple supported types;
processing an invalidation request specifying invalidation parameters used to determine an invalidation address range and invalidation type information, in order to invalidate any data items held in the cache storage that are both associated with the invalidation address range and have an associated type that is indicated by the invalidation type information;
employing filtering circuitry, whilst processing of the invalidation request is yet to be completed, to perform a filtering operation for a received lookup request, in order to determine, in dependence on the address indication provided by the received lookup request and one or more of the invalidation parameters of the invalidation request, intersection indication data identifying, for a given type in the given subset, whether an intersection is considered to exist between any entries that would be accessed during performance of the lookup procedure for the received lookup request for the given type and any entries that will be invalidated during processing of the invalidation request; and
controlling performance of the lookup procedure in dependence on the intersection indication data.

16. A non-transitory computer-readable medium to store computer-readable code for fabrication of an apparatus comprising:
a cache storage having a plurality of entries for storing data items, wherein each entry is arranged to have type information associated therewith to indicate a type associated with the data item stored in that entry, and wherein for each entry the type is one of multiple supported types for which the cache storage is enabled to store data items;
lookup circuitry to process lookup requests, wherein the lookup circuitry is responsive to a given lookup request providing an address indication to perform a lookup procedure to determine whether a hit is detected indicating that an entry of the cache storage stores a data item associated with the address indication, by default the lookup circuitry being arranged to perform the lookup procedure for a given subset of the multiple supported types;
invalidation circuitry to process an invalidation request specifying invalidation parameters used to determine an invalidation address range and invalidation type information, in order to invalidate any data items held in the cache storage that are both associated with the invalidation address range and have an associated type that is indicated by the invalidation type information; and filtering circuitry arranged, whilst processing of the invalidation request is yet to be completed, to perform a filtering operation for a received lookup request, in order to determine, in dependence on the address indication provided by the received lookup request and one or more of the invalidation parameters of the invalidation request, intersection indication data identifying, for a given type in the given subset, whether an intersection is considered to exist between any entries that would be accessed during performance of the lookup procedure for the received lookup request for the given type and any entries that will be invalidated during processing of the invalidation request, and to control operation of the lookup circuitry in dependence on the intersection indication data.

* * * * *